United States Patent
Miura et al.

(10) Patent No.: US 8,353,396 B2
(45) Date of Patent: Jan. 15, 2013

(54) DOOR CONVEYING APPARATUS

(75) Inventors: Junichi Miura, Tokyo (JP); Toshio Nii, Osaka (JP); Mitsugu Kamiya, Osaka (JP)

(73) Assignees: Daifuku Design and Engineering Co., Ltd. (JP); Daifuku Co., Ltd. (JP); Honda Motor Co., Ltd. (JP)

( * ) Notice: Subject to any disclaimer, the term of this patent is extended or adjusted under 35 U.S.C. 154(b) by 394 days.

(21) Appl. No.: 12/720,346

(22) Filed: Mar. 9, 2010

(65) Prior Publication Data

US 2010/0236896 A1    Sep. 23, 2010

(30) Foreign Application Priority Data

Mar. 19, 2009 (JP) ................................. 2009-067744

(51) Int. Cl.
*B65G 17/20* (2006.01)
(52) U.S. Cl. .................................................. 198/678.1
(58) Field of Classification Search ............... 198/465.1, 198/465.4, 345.3, 485.1, 486.1, 678.1
See application file for complete search history.

(56) References Cited

U.S. PATENT DOCUMENTS

| | | | | |
|---|---|---|---|---|
| 3,683,817 A | * | 8/1972 | Macomber et al. ............. | 104/89 |
| 4,331,229 A | * | 5/1982 | Kamm ....................... | 198/345.3 |
| 4,442,335 A | * | 4/1984 | Rossi .............................. | 219/79 |
| 4,483,476 A | * | 11/1984 | Fujikawa et al. ............... | 228/4.1 |
| 4,589,184 A | * | 5/1986 | Asano et al. ..................... | 29/430 |
| 4,609,093 A | * | 9/1986 | Taketani et al. ................ | 198/378 |
| 4,930,213 A | * | 6/1990 | Hayakawa et al. ............. | 29/793 |
| 5,123,161 A | * | 6/1992 | Kubo et al. ..................... | 29/784 |
| 5,184,766 A | * | 2/1993 | Takahashi et al. ............. | 228/4.1 |
| 5,203,811 A | * | 4/1993 | Hirotani et al. ............. | 29/407.05 |
| 5,406,697 A | * | 4/1995 | Busisi ............................ | 29/721 |
| 7,748,514 B2 | * | 7/2010 | Shimizu et al. ............. | 198/346.1 |

FOREIGN PATENT DOCUMENTS

JP    1317881 A    12/1989

* cited by examiner

*Primary Examiner* — Gene Crawford
*Assistant Examiner* — William R Harp
(74) *Attorney, Agent, or Firm* — St. Onge Steward Johnston & Reens LLC

(57) ABSTRACT

A door conveying apparatus for a work area has a door conveying traveling body with door hanger supporting portions on both left and right sides thereof supporting two door hangers, a space is formed between the two door hangers and the topside thereof is closed by the door conveying traveling body and both left and right sides thereof are closed by the door hangers, and the downside thereof and traveling-direction both front and rear sides of the door conveying traveling body are open, and each door hanger is provided with door supports supporting doors on a side of the door hanger opposite to a side adjoining the space.

2 Claims, 17 Drawing Sheets

DOOR CONVEYING APPARATUS

CROSS-REFERENCE TO RELATED APPLICATIONS

The present application claims priority of Japanese patent application No. JP2009-67744 filed on Mar. 19, 2009, the content of which is incorporated herein by reference.

FIELD OF THE INVENTION

The present invention relates to a door conveying apparatus conveying doors having been detached from a vehicle body of a motor vehicle.

BACKGROUND OF THE INVENTION

As this kind of door conveying apparatus, there has been known a door conveying apparatus configured such that a suspended member provided with door hanger supports on both left and right sides thereof is attachably and detachably suspended from a door conveying traveling body which travels on a door conveying line, and the door hanger supports on both left and right sides of the suspended member attachably and detachably support door hangers, respectively, as described in Japanese unexamined patent application publication No. H01-317881 published on Dec. 22, 1989 (hereinafter, referred to as 'patent literature'). More specifically, the door hanger supports on both left and right sides of the suspended member are constituted by upper side latching portions for hanging upper ends of the door hangers and lower side support stands for receiving lower ends of the door hangers. The lower side support stands of the door hanger supports on both left and right sides are configured to be coupled to each other by a horizontal coupling member.

In the conventional door conveying apparatus as described in the above-described patent literature, the suspended member suspended from the door conveying traveling body and constituting the door hanger supports of the door conveying traveling body side is configured such that the lower side support stands of the door hanger supports on both left and right sides are coupled to each other by the horizontal coupling member, as described above. Thus, a space between the doors (the door hangers) on both left and right sides of the door conveying traveling body is blocked from a space on the floor by the suspended member (the above-described horizontal coupling member) in a state of supporting the doors (the door hangers) on both left and right sides of the door conveying traveling body via the suspended member. A space below the door conveying traveling body and between the doors (the door hangers) on both left and right sides cannot be used as a passage for maintenance work for the door hanger and door conveying traveling body, a traveling passage for component supply trucks to be used in an outfitting work area where components are mounted on the doors conveyed by the door conveying apparatus, etc.

SUMMARY OF THE INVENTION

Accordingly, it is an object of the present invention to provide a door conveying apparatus capable of solving the above-described conventional problem. The door conveying apparatus according to the present invention, described with reference numerals and letters of an embodiment as described below in parentheses for reference purposes, is configured such that a door hanger (9R, 9L) conveyed by a door conveying traveling body (40) traveling on a door conveying line is provided with a supported portion (15a, 15b) only on an upper portion thereof, the door conveying traveling body (40) is provided with a door hanger supporting portion (48a, 48b) on both left and right sides thereof supporting only the supported portion (15a, 15b) of the door hanger (9R, 9L), a space (S) that when door hangers (9R, 9L) are supported by the door hanger supporting portions (48a, 48b) on both left and right sides respectively, the topside thereof is closed by the door conveying traveling body (40) and both left and right sides thereof are closed by the door hangers (9R, 9L) hanging from the door conveying traveling body (40) and the downside thereof and traveling-direction both front and rear sides of the door conveying traveling body (40) are opened is formed between both door hangers (9R, 9L), and each door hanger (9R, 9L) is provided with door supports (11, 12) supporting a door (DR, DL) outside opposite to a side adjoining the space (S).

With the above-described door conveying apparatus according to the present invention, it is possible that left and right doors detached from a vehicle body on a vehicle body conveying line, for example, are transferred on the door hangers respectively, the door hangers are made to be supported on both left and right sides of the door conveying traveling body respectively and sent into an outfitting work area, outfitting work of mounting components, etc., relative to the doors kept supported on both left and right sides of the door conveying traveling body respectively is carried out, and the fitted-out doors are again conveyed as-is by the door conveying traveling body to a work position of attaching the doors to the original vehicle body on the vehicle body conveying line. In particular, according to the configuration of the present invention, the space that the downside thereof and the traveling-direction both front and rear sides of the door conveying traveling body are opened is ensured between both door hangers supported on both left and right sides of the door conveying body, while directly adjoined by both left and right door hangers. Therefore, as long as a height above the floor of the door conveying traveling body is configured to be high enough for workers to stand on the floor, the floor immediately below the door conveying traveling body and between the door hangers on both left and right sides can be used as a workers' passage, and using this passage, maintenance work for the inside opposite to the outside on which the door of the door hanger is supported and the lower side of the door conveying traveling body can easily and safely be carried out. Further, depending on the structure of the door hanger, outfitting work relative to a side of the supported door facing the door hanger becomes possible. Furthermore, the above-described passage can also be used as a traveling passage for component supply trucks in the outfitting work area, and depending on the circumstances, equipment such as a fixed shelf is installed on the passage, thereupon also allowing floor use efficiency to be improved.

In carrying out the above-described present invention, specifically, the door hanger (9R, 9L) can be configured such that an upper end of the door (DR, DL) supported by the door hanger (9R, 9L) is lower than the door conveying traveling body (40) including the door hanger supporting portion (48a, 48b) in a state where the door hanger (9R, 9L) is supported by the door hanger supporting portion (48a, 48b) of the door conveying traveling body (40). According to this configuration, even if a height above the floor of the lower end of the door hanger supported on both left and right sides of the door conveying traveling body is configured to be low in the outfitting work area, etc., so as to easily carry out outfitting work relative to the entire region from the lower edge to the upper edge of the door supported by the door hanger, a height above the floor of the space immediately below the door conveying traveling body can be raised sufficiently, which becomes advantageous when the space is used as a maintenance work passage or truck traveling passage.

Further, each door hanger (9R, 9L) can be provided with a suspended portion (14a, 14b) projecting higher than the supported portion (15a, 15b). According to this configuration, the suspended portion projecting higher than the supported portion of the door hanger can be used when the door hanger detached from the door hanger supporting portion of the door conveying traveling body is suspended and conveyed by another auxiliary conveyor.

The door is supported outside the door hanger. Thus, when the door hanger supporting the door is suspended, the door hanger is suspended in a position closer to the outside where the door is supported than the door hanger, whereby the door hanger can be hung perpendicularly. Accordingly, the suspended portion comes to be provided so as to project outside more than the door hanger. If the supported portion provided on the upper end portion of the door hanger in order to be supported by the door hanger supporting portion of the door conveying traveling body is provided so as to project outside more than the door hanger, a door hanger supporting portion which goes over the door hanger from the door conveying traveling body located inside more than the door hanger and extends outward from the door hanger must be provided, which complicates the structure and resultingly the implementation becomes difficult.

Thus, the supported portion (15a, 15b) of the door hanger (9R, 9L) is provided in a cantilever manner on a side opposite to a side where the door supports (11, 12) are located, projecting from an upper end of a suspension frame provided with the door supports on one side, and the door conveying traveling body (40) can be provided with an abutting portion (52a, 52b) abutting against a side surface (an abutted surface 20a) of the door hanger (9R, 9L) and preventing a lower portion of the door hanger (9R, 9L) from swinging to the downside of the door conveying traveling body (40) when the supported portion (15a, 15b) of the door hanger (9R, 9L) is supported by the door hanger supporting portion (48a, 48b) of the door conveying traveling body (40). According to this configuration, the supported portion provided projecting in a cantilever manner toward the inside from the door hanger but not the outside where the door is supported is configured to be supported by the door hanger supporting portion of the door conveying traveling body. Therefore, the door hanger supporting portion of the door conveying traveling body can easily be configured with a simple structure. At this time, the supported door hanger supports the door outside, so that the lower end thereof swings inside and tilts. However, the tilting of the door hanger is abut-stopped by the abutting portion provided to the door conveying traveling body. Since the door hanger can prevent not only lateral swinging but also be held in a posture of hanging vertically from the door conveying traveling body without fail, the outfitting work relative to the door supported by the door hanger cannot be adversely affected.

In this case, it is possible that the abutting portion (52a, 52b) of the door conveying traveling body (40) is composed of a roller pivotally supported by a shaft parallel to a traveling direction of the door conveying traveling body (40), the side surface of the door hanger (9R, 9L) against which the abutting portion (the roller 52a, 52b) abuts is composed of a vertical abutted surface (20a) of a guide member (20) attached to the suspension frame (10), and a lower end portion of the guide member (20) is provided with an inclined guide surface (20b) guiding the abutting portion (the roller 52a, 52b) to the abutted surface (20a). Additionally, it is also possible that the supported portion (15a, 15b) of the door hanger (9R, 9L) is provided projecting with a vertical pin (53) upward, and the door hanger supporting portion (48a, 48b) of the door conveying traveling body (40) is provided with a fitted bore (19) into which the vertical pin (53) is fitted when the supported portion (15a, 15b) of the door hanger (9R, 9L) is supported. According to these configurations, only vertical movements of the door hanger relative to the door hanger supporting portion of the door conveying traveling body allows for attachment and detachment of the door hanger relative to the door hanger supporting portion of the door conveying traveling body. Consequently, not only is making a machine carry out the attachment and detachment of the door hanger facilitated, but also making it determine a position of the door hanger relative to the door conveying traveling body becomes possible.

DETAILED DESCRIPTION OF THE INVENTION

Figure 1:
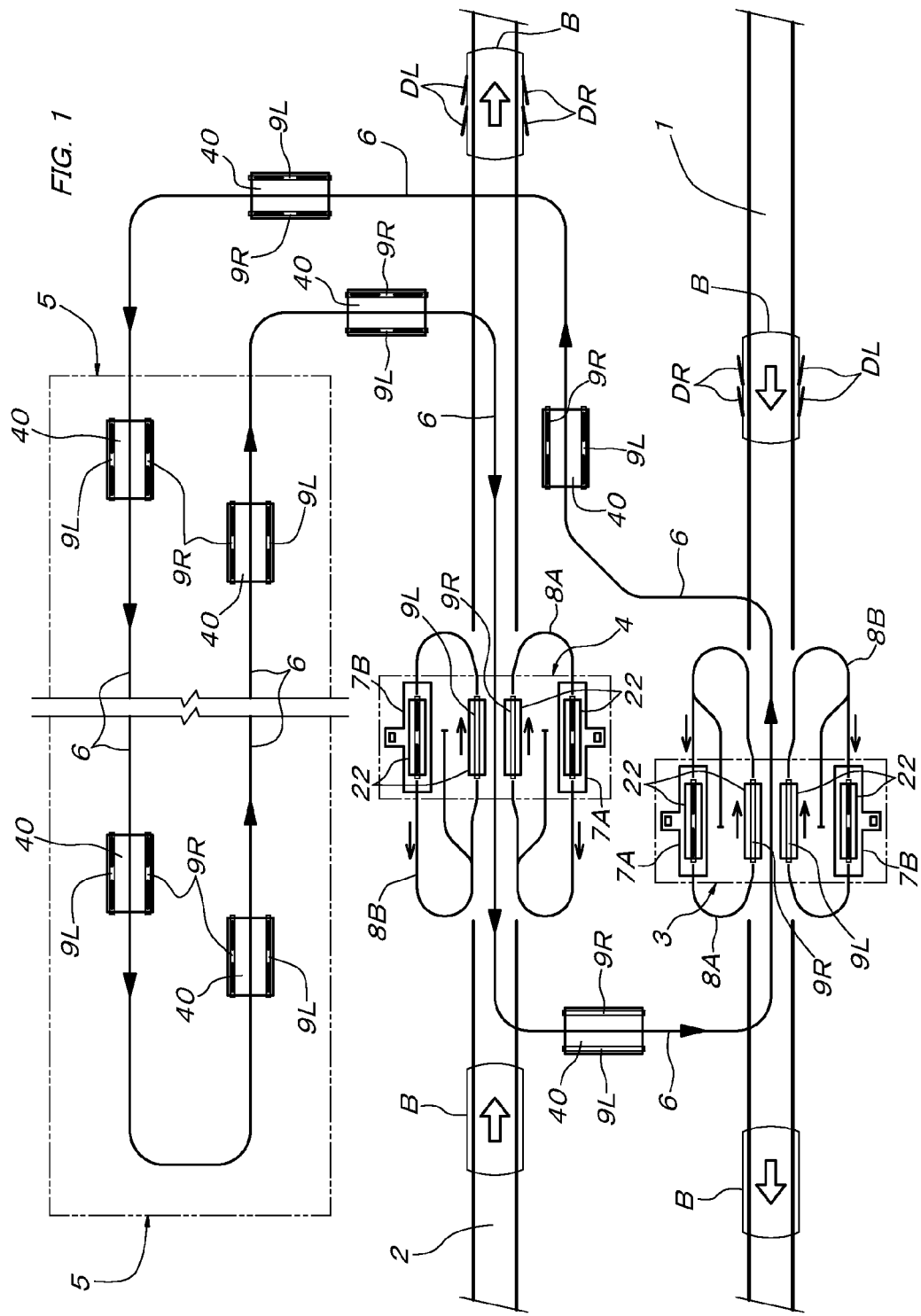
FIG. 1 is a layout diagram of a conveying path showing one use form of door conveying equipment using a door conveying apparatus according to the present invention.

Hereinafter, a specific embodiment of the entire door conveying equipment using a door conveying apparatus according to the present invention will be described based on the accompanying drawings. In the layout diagram of FIG. 1, reference numeral 1 is a vehicle body conveying line for door detachment, reference numeral 2 is a vehicle body conveying line for door attachment, reference numeral 3 is a door detaching work area configured on the vehicle body conveying line for door detachment 1, reference numeral 4 is a door attaching work area configured on the vehicle body conveying line for door attachment 2 and reference numeral 5 is an outfitting work area for doors having been detached. The vehicle body conveying line for door detachment 1 and the vehicle body conveying line for door attachment 2 are constituted by a floor conveyor which supports and conveys a vehicle body B on a floor work level. Reference numeral 6 is a door conveying apparatus according to the present invention, and is composed of an overhead conveyor in which a door conveying traveling body 40 travels on a door conveying line at an appropriate height above the floor, from the inside of the door detaching work area 3, the inside of the outfitting work area 5 through the inside of the door attaching work area 4 in this order and then back to the inside of the door detaching work area 3.

In the door detaching work area 3 and the door attaching work area 4, conveying lines of the door conveying apparatus 6 are arranged immediately above the vehicle body conveying line for door detachment 1 and the vehicle body conveying line for door attachment 2 so as to be parallel to each other and opposite in a conveying direction to each other. The door detaching work area 3 and the door attaching work area 4 are arranged with lifting devices 7A and 7B and auxiliary conveyors 8A and 8B on both left and right sides of each vehicle body conveying line 1, 2 (each conveying line of the door conveying apparatus 6), respectively.

Figure 2:
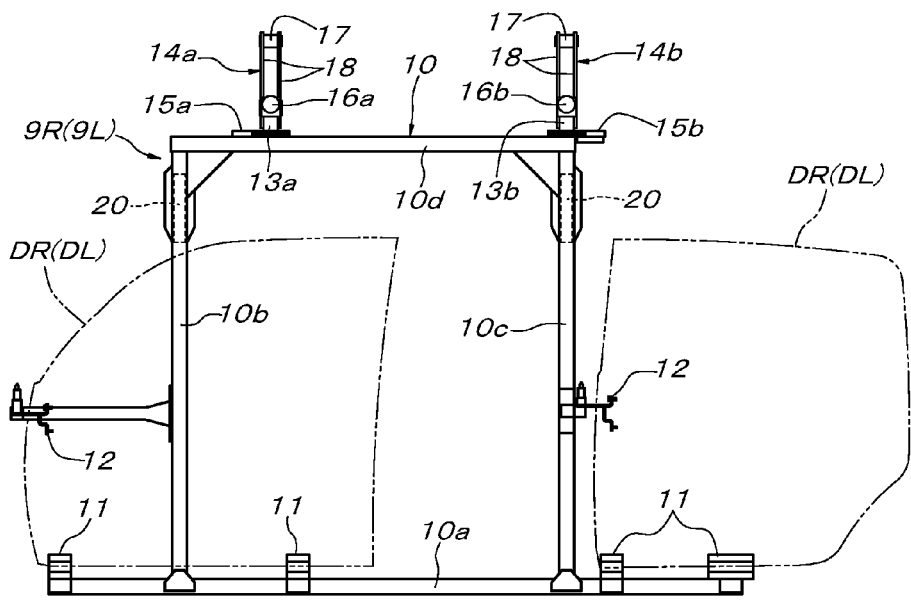
FIG. 2 is a side view of a door hanger.
Figure 3:
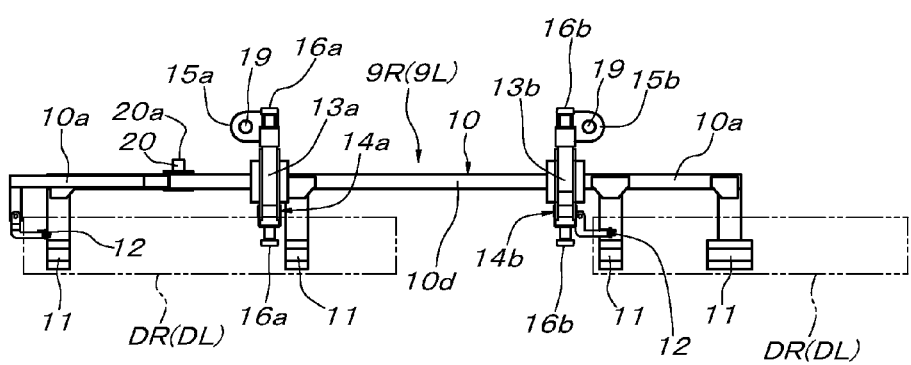
FIG. 3 is a plan view of the door hanger.
Figure 4:
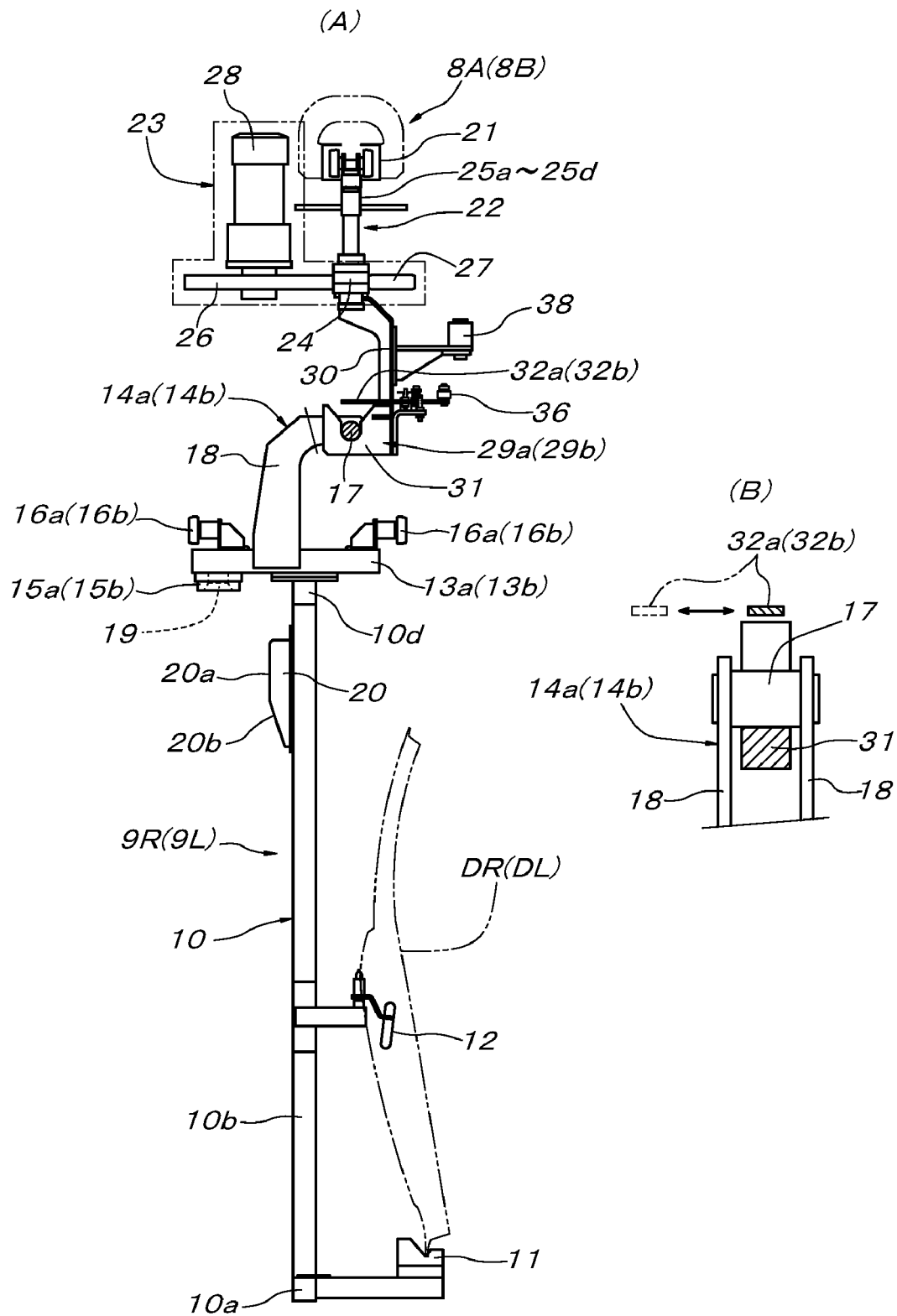
FIG. 4A is a partially notched front view showing a state where the door hanger is suspended from a moving body of an auxiliary conveyor.
FIG. 4B is an enlarged longitudinal sectional side view of a door hanger suspending portion of the moving body.

Right side doors DR and left side doors DL having been detached from the vehicle body B are handled by the lifting devices 7A and 7B, the auxiliary conveyors 8A and 8B and the door conveying apparatus 6, while separated and supported by a door hanger 9R for the right side doors and a door hanger 9L for the left side doors, respectively. The door hanger 9R for the right side doors and the door hanger 9L for the left side doors have a bilateral symmetrical structure, and, as shown in FIGS. 2 to 4, the door hanger detachably and attachably supports a pair of front and rear right side doors DR or left side doors DL on one side of an upright rectangular frame-shaped suspension frame 10 parallel to a conveying direction, in a posture substantially upright and parallel to the suspension frame 10, via door bottom portion supports 11 provided projecting on one side from the lower end forward and rearward direction frame member 10a of the suspension frame 10 and door hinge portion supports 12 provided projecting on one side from both front and rear vertical frame members 10b and 10c of the suspension frame 10. The suspension frame 10 has an upper end forward and rearward direction frame member 10d, to which horizontal members 13a and 13b projecting to both left and right sides are adhered at two front and rear places thereof. Suspended portions 14a and 14b, supported portions 15a and 15b and a pair of left and right guide rollers 16a and 16b pivotally supported by transverse horizontal shafts are mounted on the horizontal members 13a and 13b, respectively.

The pair of front and rear suspended portions 14a and 14b are configured by each constructing a shaft body 17 parallel to the conveying direction between a pair of front and rear supporting plates 18. The shaft body 17 is located in a position displaced to the side where the doors DR, DL supported on one side of the suspension frame 10 are placed, relative to a position immediately above the suspension frame 10 when the suspension frame 10 is viewed from the front and rear of the conveying direction as shown in FIG. 4, and the suspension frame 10 supporting the doors DR, DL is configured to hang substantially perpendicularly by gravity when the shaft bodies 17 are suspended. The pair of front and rear supported portions 15a and 15b are provided projecting in the forward and rearward direction from one of both left and right ends of the horizontal members 13a and 13b which extend to a side opposite to a side where the doors DR, DL are supported relative to the suspension frame 10, and the paired supported portions 15a and 15b include vertically penetrating fitted bores 19, respectively. Furthermore, to the front and rear vertical frame members 10b and 10c of the suspension frame 10, guide members 20 forming vertical abutted surfaces 20a are attached respectively on a side where the supported portions 15 are provided relative to the suspension frame 10, of both left and right sides of upper end portions of the vertical frame members 10b and 10c. The guide member 20 has a lower end portion provided with an inclined guide surface 20b whose upper end connects to the abutted surface 20a.

Figure 5:
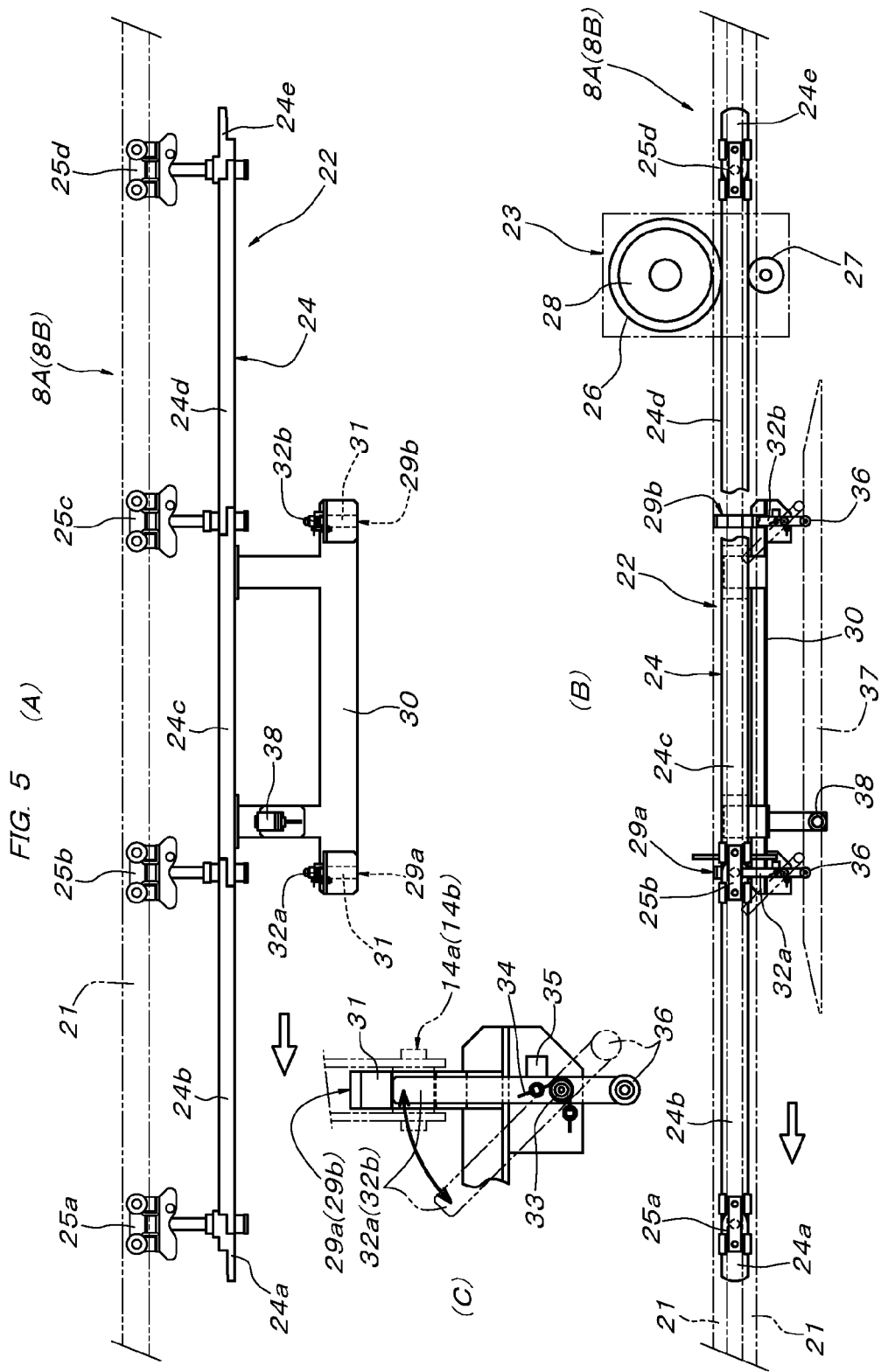
FIG. 5A is a side view showing the moving body of the auxiliary conveyor.
FIG. 5B is a partially notched plan view showing the moving body and drive means.
FIG. 5C is an enlarged plan view showing the door hanger suspending portion of the moving body.
Figure 6:
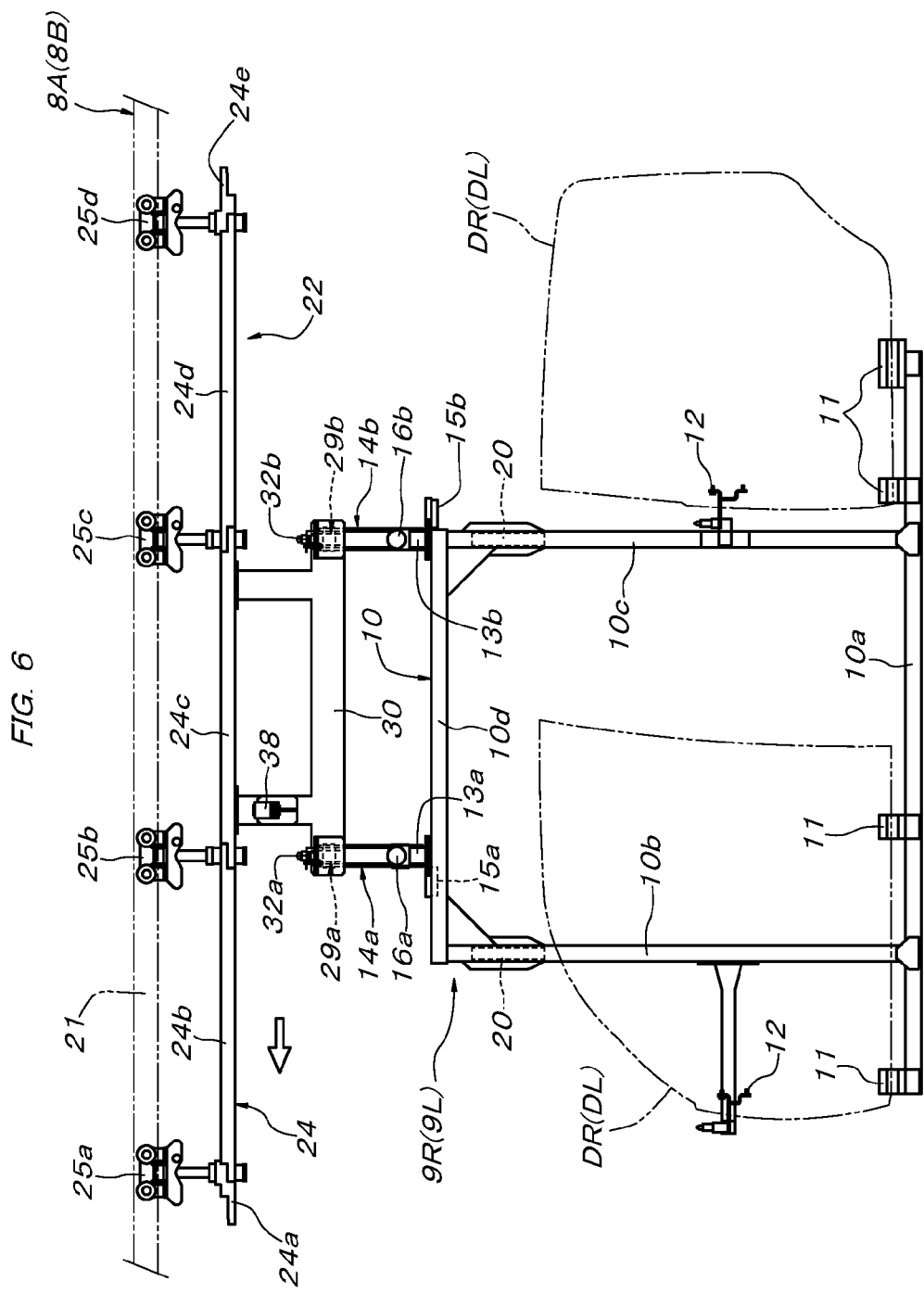
FIG. 6 is a side view showing a state where the door hanger is suspended from the moving body of the auxiliary conveyor.

The auxiliary conveyors 8A and 8B have the same structure. As shown in FIGS. 4 to 6, the conveyor includes a guide rail 21 built at an appropriate height above the floor, a moving body 22 travelably supported by the guide rail 21 and drive means 23 for travel-driving the moving body 22. The moving body 22 is composed of a load bar 24 and four trolleys 25a to 25d suspending the load bar 24. The load bar 24 is composed such that short front and rear end load bar units 24a and 24e and three intermediate load bar units 24b to 24d are coupled curvably at least in the horizontal direction. Each trolley 25a to 25d is arranged so as to suspend a coupling portion of each load bar unit 24a to 24e. Such drive means 23 that consists of a friction drive wheel 26 and a backup roller 27 sandwiching both left and right side surfaces of the load bar 24, and a motor 28 rotation-driving the friction drive wheel 26, for example, can be used. Since an overhead conveyor constituted by the guide rail 21, moving body 22 and drive means 23 is well-known, its detailed description is omitted.

The moving body 22 is provided with a pair of front and rear hanger suspending portions 29a and 29b on the lower side of the intermediate load bar unit 24c of the load bar 24. The hanger suspending portion 29a, 29b is composed of a hook member 31 having an upper side opened and provided projecting to either left or right side from a frame member 30 consecutively provided on the lower side of the intermediate load bar unit 24c. As shown in FIG. 4A and FIG. 4B, the hook member 31 is upwardly fitted from the lower side to the shaft body 17 of the suspended portion 14a, 14b and supports the suspended portion 14a, 14b while being fitted between the pair of front and rear supporting plates 18 in the pair of front and rear suspended portions 14a and 14b of the door hanger 9R, 9L. Further, the pair of front and rear hanger suspending portions 29a and 29b are provided along with stoppers 32a and 32b opening and closing upper side opening portions of the hook members 31.

The stopper 32a, 32b has a longitudinal-direction intermediate portion which is formed of a strip plate pivotally supported on the frame member 30, swingably back and forth about a vertical shaft 33, as shown in FIG. 5C. A distal end of the stopper is biased and held by a torsion coil spring 34 and a blocking member 35 in a closed position in which the upper side opening portion of the hook member 31 is closed. To a rear end of the stopper, a cam following roller 36 pivotally supported by a vertical shaft is attached. Thus, as shown by the phantom lines in FIGS. 5B and 5C, a cam rail 37 switching the stopper 32a, 32b, via the cam following roller 36, to a release position in which the upper side opening portion of the hook member 31 is opened, against biasing force of the torsion coil spring 34 is provided along with a hanger transfer position on the traveling path of the moving body 22. Further, a positioning held portion 38 is provided to the moving body 22 so as to project to one of the left and right sides in a position in the vicinity of the front end of the frame member 30, that is, to a side opposite to the side where the hook member 31 is provided projecting relative to the frame member 30. This positioning held portion 38 is configured by a roller pivotally supported by a vertical shaft.

Figure 7:
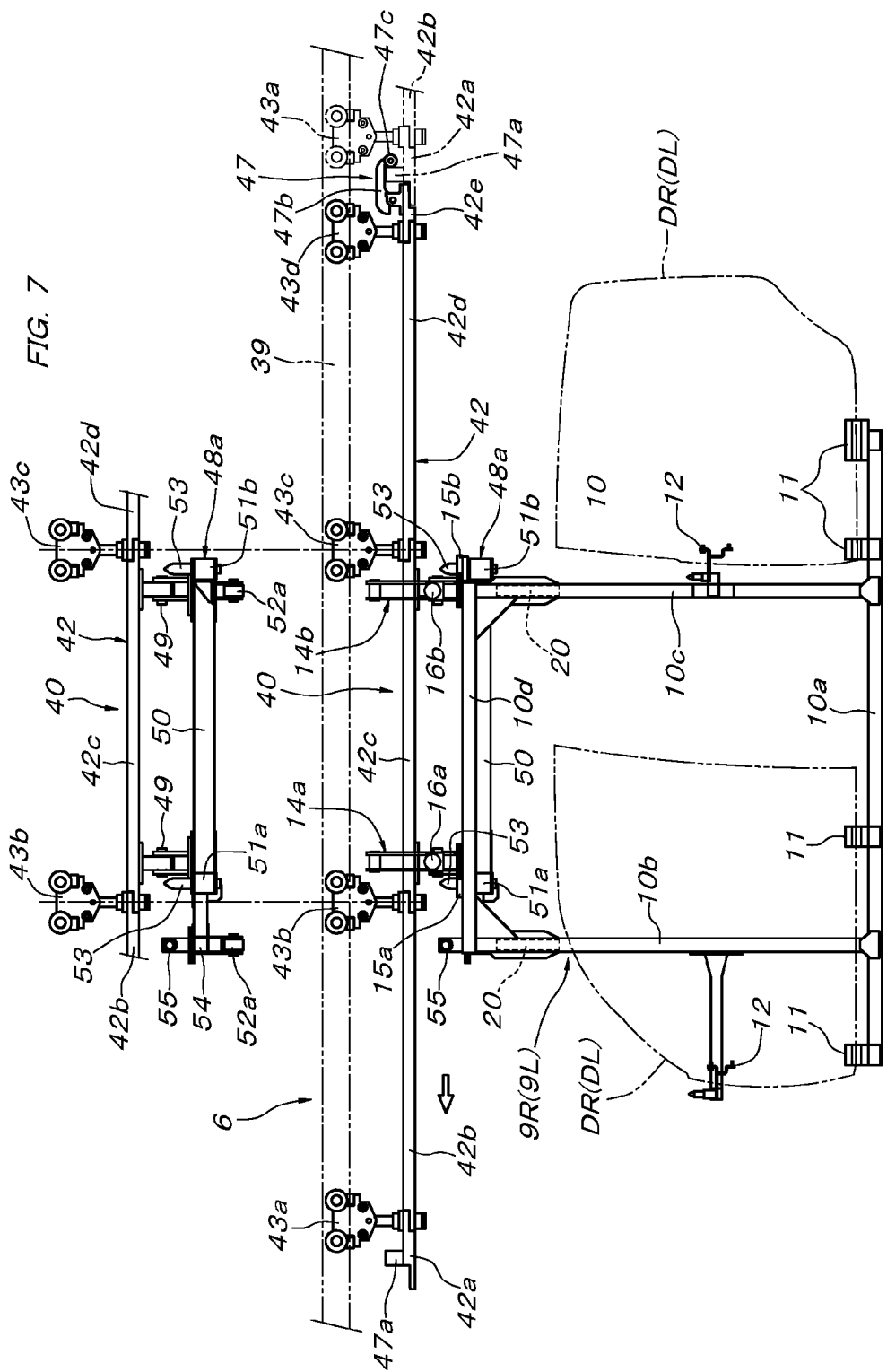
FIG. 7 is a side view showing a state where the door hanger is suspended from the door conveying traveling body in the door conveying apparatus according to the present invention and a side view showing a main part of the door conveying traveling body.
Figure 8:
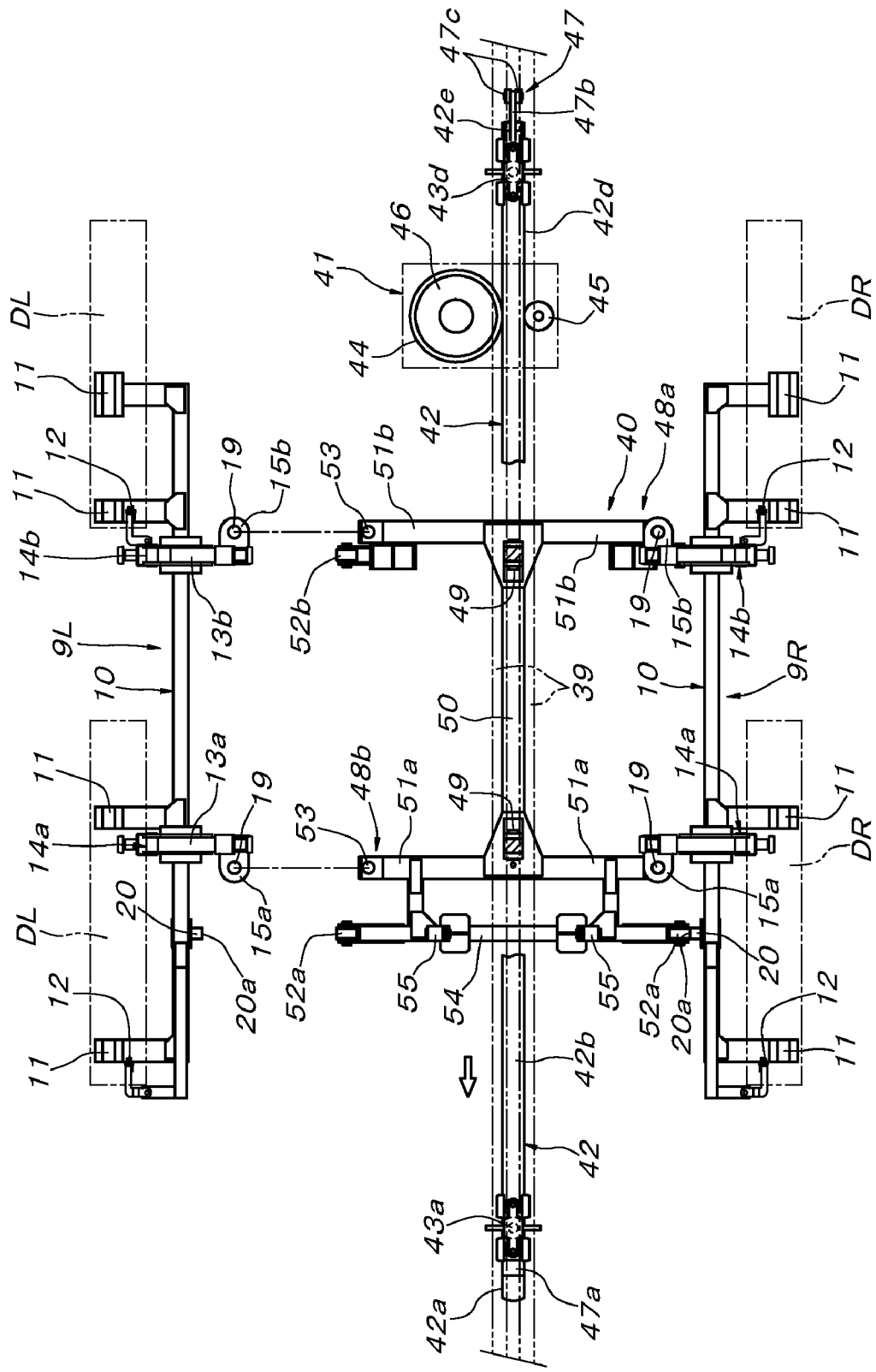
FIG. 8 is a plan view showing the door conveying traveling body and the door hangers suspended therefrom.

Now, a configuration of the door conveying apparatus 6 will be described based on FIGS. 7 to 9. The door conveying apparatus 6 is constituted by an overhead conveyor composed of a guide rail 39 built at an appropriate height above the floor, a door conveying traveling body 40 travelably supported by the guide rail 39 and drive means 41 causing the door conveying traveling body 40 to travel. The door conveying traveling body 40 is composed of a load bar 42 and four trolleys 43a to 43d suspending the load bar 42. The load bar 42 is composed such that short front and rear end load bar units 42a and 42e and three intermediate load bar units 42b to 42d are coupled curvably at least in the horizontal direction. Each trolley 43a to 43d is arranged so as to suspend a coupling portion of each load bar unit 42a to 42e. Such drive means 41 that consists of a friction drive wheel 44 and a backup roller 45 sandwiching both left and right side surfaces of the load bar 42, and a motor 46 rotation-driving the friction drive wheel 44, for example, can be used. The configuration of the main body composed of the load bar 42 and the trolleys 43a to 43d of the door conveying traveling body 40 is basically identical to the configuration of the above-described auxiliary conveyor 8A, 8B. What is different is that coupling means 47 is provided so as to allow door conveying traveling bodies 40 adjoining the front and rear to be coupled to each other and caused to travel integrally, for example, in the outfitting work area 5.

The coupling means 47 is composed of a latched protrusion 47a upwardly provided projecting from the distal end of the load bar unit 42a at the front end, a latching piece 47b pivotally supported vertically swingably on the upper side of the load bar unit 42e at the rear end and extending rearward and a cam following roller 47c pivotally supported on a distal end lateral side portion of the latching piece 47b. As shown by the phantom lines in FIG. 7, the latching piece 47b of a front door conveying traveling body 40 covers and is engaged with the latched protrusion 47a of a rear door conveying traveling body 40, thereby making it possible to traction-drive the rear door conveying traveling body 40 by the front door conveying traveling body 40. In a position of releasing the coupling of the front and rear door conveying traveling bodies 40, a cam rail arranged immediately beside the traveling path is made to act upon the cam following roller 47c of the latching piece 47b of the front door conveying traveling body 40, and the latching piece 47b is moved upward thereby being disengaged from the latched protrusion 47a of the rear door conveying traveling body 40. The front door conveying traveling body 40 is shifted to high speed traveling in this state, thereby decoupling separately the front and rear door conveying traveling bodies 40 having been coupled to each other.

To the door conveying traveling body 40 of the door conveying apparatus 6 thus configured, hanger supporting portions 48a and 48b bilaterally symmetrically suspending the door hanger 9R for the right side doors and the door hanger 9L for the left side doors so that the suspension frame 10 is positioned inside while the doors DR, DL are positioned outside are provided on both left and right sides of the lower side of the intermediate load bar unit 42c of the load bar 42. The hanger supporting portions 48a and 48b are provided to both left and right sides of a suspended frame 50 whose width-direction middle position is swingably suspended in a lower side middle position of the intermediate load bar unit 42c by horizontal shafts 49 parallel to the traveling direction. More specifically, each hanger supporting portion 48a, 48b includes a pair of front and rear support members 51a, 51b transversely extending from both front and rear ends of the suspended frame 50 and supporting the pair of front and rear supported portions 15a, 15b of the door hanger 9R, 9L at a distal end thereof, and a pair of front and rear abutting portions 52a, 52b composed of rollers pivotally supported by longitudinal horizontal shafts so as to rollably abut against the vertical abutted surfaces 20a of the paired front and rear guide members 20 of the door hanger 9R, 9L. The above-described each support member 51a, 51b is provided with a vertical pin 53 upwardly fitting into the fitted bore 19 provided to the supported portion 15a, 15b of the door hanger 9R, 9L side to be supported. Further, the front support member 51a of the paired front and rear support members 51a and 51b is provided consecutively with a transverse horizontal frame member 54 positioned in front thereof and parallel thereto. The front abutting portion (roller) 52a of the paired front and rear abutting portions (rollers) 52a and 52b is provided on both left and right ends of the transverse horizontal frame member 54. Further, a pair of left and right anti-sway guide rollers 55 pivotally supported by transverse horizontal shafts, respectively, are provided at the upper side of the transverse horizontal frame member 54.

Figure 10:
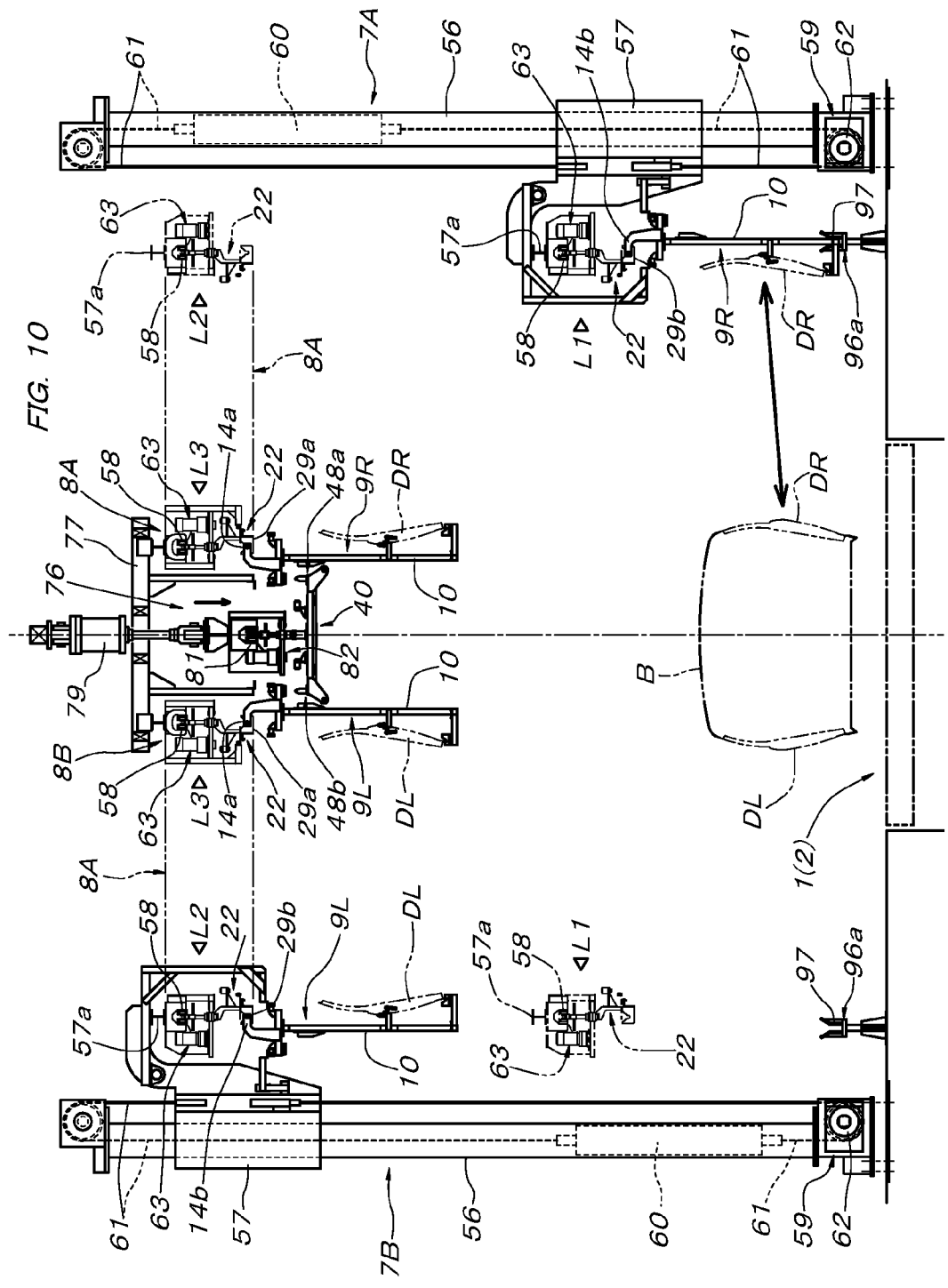
FIG. 10 is a front view showing a door detachment/a detaching work area.
Figure 11:
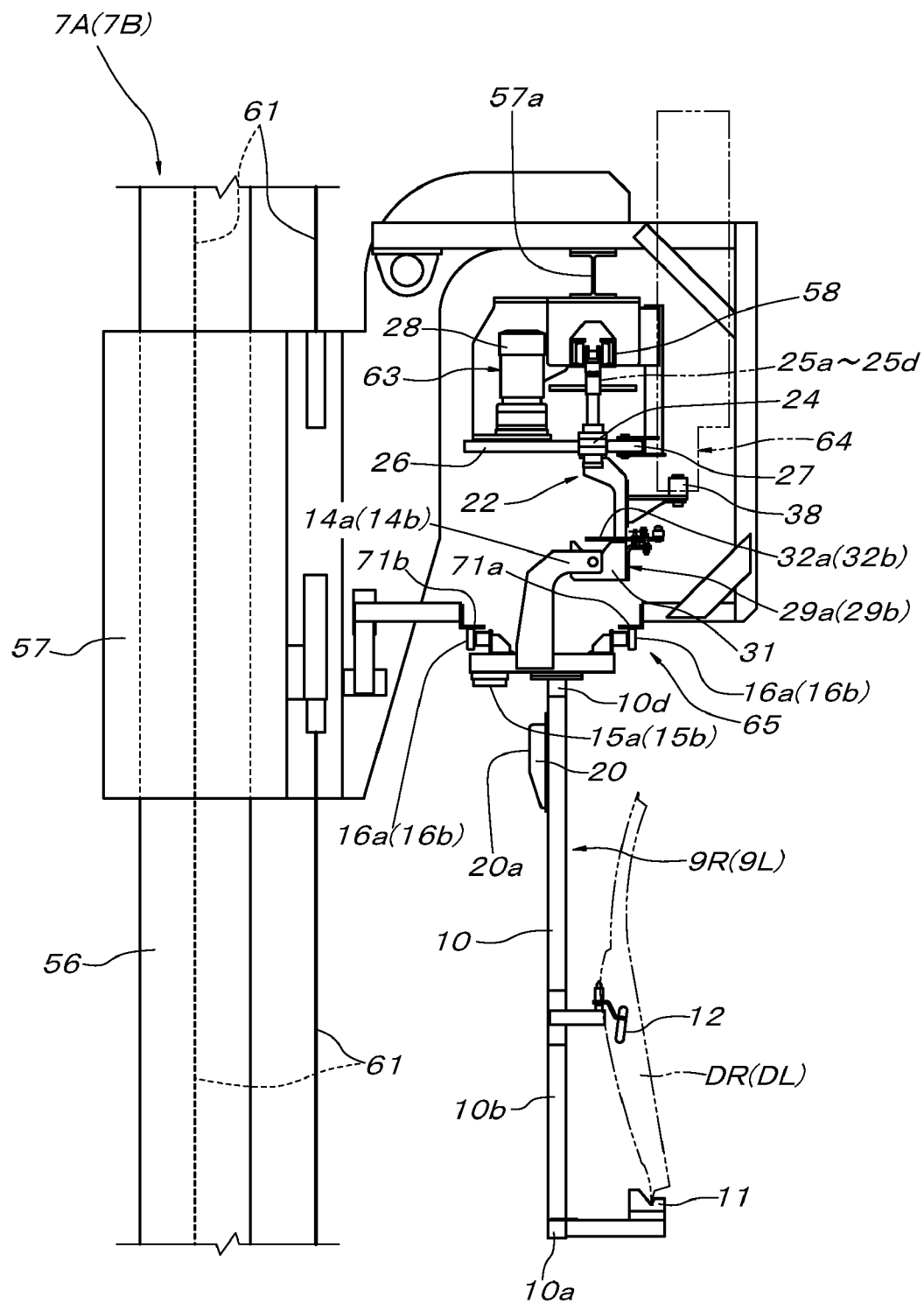
FIG. 11 is a side view showing a lifting device and the moving body which is suspended therefrom to ascend and descend and suspends a door hanger.
Figure 12:
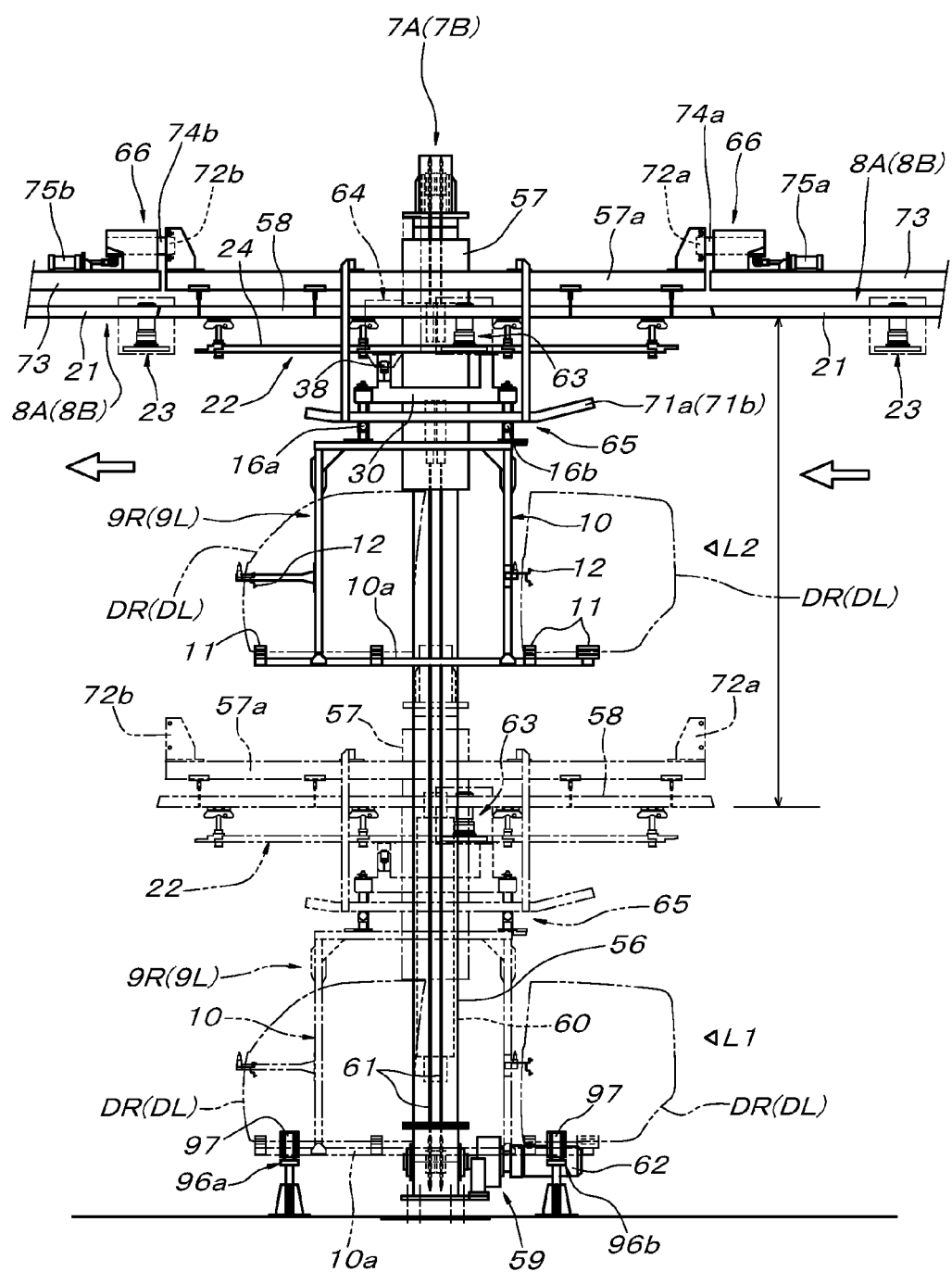
FIG. 12 is a front view showing the lifting device and the moving body which is suspended therefrom to ascend and descend and suspends a door hanger.

The lifting devices 7A and 7B have the same structure. As shown in FIGS. 10 to 12, the lifting device 7A, 7B ascends and descends the moving body 22 of the auxiliary conveyor 8A, 8B suspending and conveying the door hanger 9R, 9L, between a first door hanger transfer position L2 at the upper side where the door hanger 9R, 9L is transferred between the lifting device 7A, 7B and the auxiliary conveyor 8A, 8B and a door loading/unloading position L1 on the floor side, by a lifting body 57 lift-driven along a lifting guide column 56 installed upright on the floor. The lifting body 57 includes a horizontal beam 57a on a side of the lifting guide column 56 facing the vehicle body conveying line 1, 2. On the lower side of the horizontal beam 57a, a lifting guide rail 58 supporting the moving body 22 is constructed parallel with the horizontal beam 57a. As lift-drive means 59 of the lifting body 57, available is a conventional one configured such that a wrapping transmission device (such as a chain, a wire rope, etc.) 61 stretched between both upper and lower ends of the lifting guide column 56 is driven by a motor 62 to move up and down a lifting balance weight 60 loosely fitted inside the lifting guide column 56 and the lifting body 57 in the vertically reverse direction to each other. Thus, the lifting guide rail 58 lift-driven by the lifting body 57 connects with the guide rail 21 of the auxiliary conveyor 8A, 8B in the first door hanger transfer position L2 which is an ascent limit position, as shown in FIG. 12, and the lifting guide rail 58 is constituted by the divided part of the guide rail 21.

The lifting body 57 constructing the lifting guide rail 58 is provided along with drive means 63 for drawing the moving body 22 of the auxiliary conveyor 8A, 8B side into a fixed position on the lifting guide rail 58 from the upstream side and sending out the moving body 22 to the downstream side, moving body positioning means 64 for positioning the moving body 22 in the fixed position, swing blocking means 65 for blocking lateral swing of the door hanger 9R, 9L having been suspended from the moving body 22 on the lifting guide rail 58 and lock means 66 for locking the lifting guide rail 58 in the ascent limit position of connecting to the guide rail 21 of the auxiliary conveyor 8A, 8B side, that is, in a state of being in the first door hanger transfer position L2.

Figure 18:
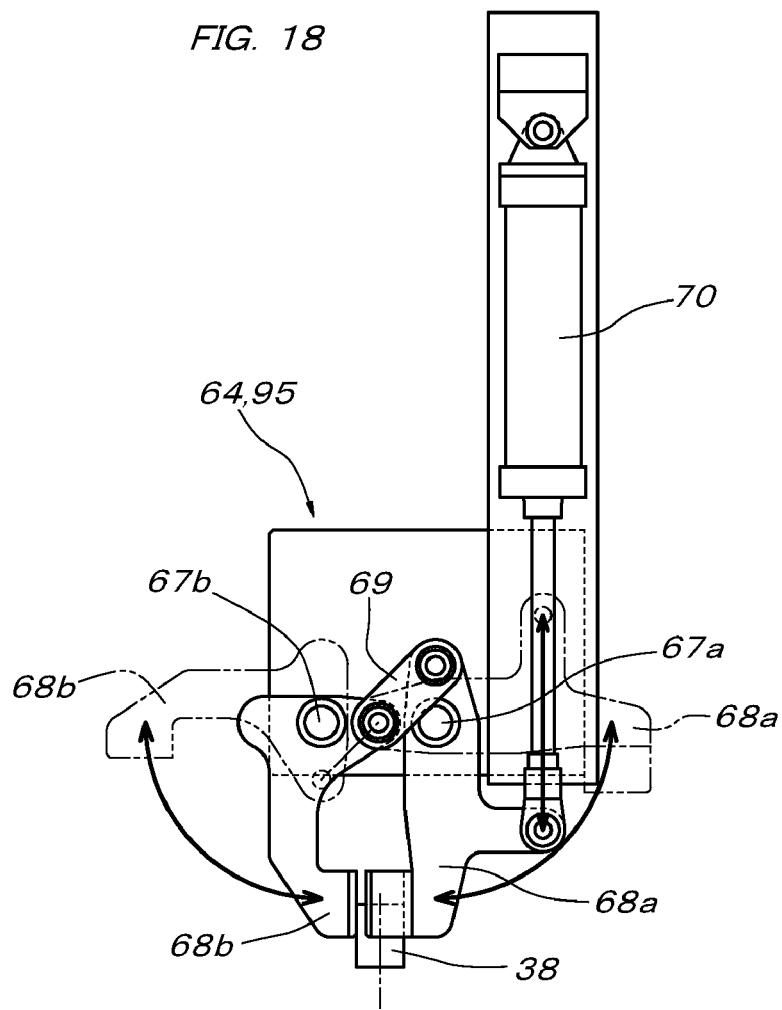
FIG. 18 is a side view showing moving body positioning means provided along with the lifting device, etc.

The drive means 63 having the same structure as the drive means 23 for travel-driving the moving body 22 in the auxiliary conveyor 8A, 8B is used, and accordingly, the same reference numerals and letters are given and their description is omitted. The moving body positioning means 64 constituted by, for example, as shown in FIG. 18, a pair of front and rear holding pieces 68a and 68b pivotally supported by shafts 67a and 67b vertically openably and closably so as to hold the positioning held portion (roller) 38 provided to the moving body 22 from both front and rear sides, a link 69 associatively connecting both holding pieces 68a and 68b with each other such that both holding pieces 68a and 68b make opening and closing movements in conjunction and a cylinder unit 70 open-close driving one of the holding pieces 68b can be used. As shown in FIG. 11 and FIG. 12, the swing blocking means 65 is constituted by a pair of left and right anti-sway guide rails 71a and 71b supported by the lifting body 57 so as to abut against upper sides of two front and rear pairs of left and right guide rollers 16a and 16b. The lock means 66 is already known in this kind of lifting device, and as shown in FIG. 12, is composed of a fitted portion 72a, 72b attached to each end of the horizontal beam 57a of the lifting body 57, a movable fitting member 74a, 74b supported fittably and detachably relative to the fitted portion 72a, 72b and horizontally in-and-out movably, on a horizontal beam 73 supporting the guide rail 21 of the auxiliary conveyor 8A, 8B side, and a cylinder unit 75a, 75b driving the movable fitting member 74a, 74b.

The above-described auxiliary conveyor 8A, 8B is arranged in such a manner that the moving body 22 travels in horizontal circulation between the lifting device 7A, 7B and the door conveying line of the door conveying apparatus 6 arranged immediately above and parallel to the vehicle body conveying line 1, 2, as shown in FIG. 1 and FIG. 10. To a traveling path section in parallel with a traveling path section passing through the first door hanger transfer position L2 adjoining the lifting device 7A, 7B and in which the moving body 22 travels in the reverse direction, a second door hanger transfer position L3 adjoining the door conveying line of the door conveying apparatus 6 and for transferring the door hanger 9R, 9L between the auxiliary conveyor and the door conveying traveling body 40 traveling on the door conveying line is configured. More specifically, in the auxiliary conveyors 8A and 8B on both left and right sides of the vehicle body conveying line 1, 2, second door hanger transfer positions L3 are respectively configured adjoining both left and right sides of the vehicle body conveying line 1, 2.

Figure 16:
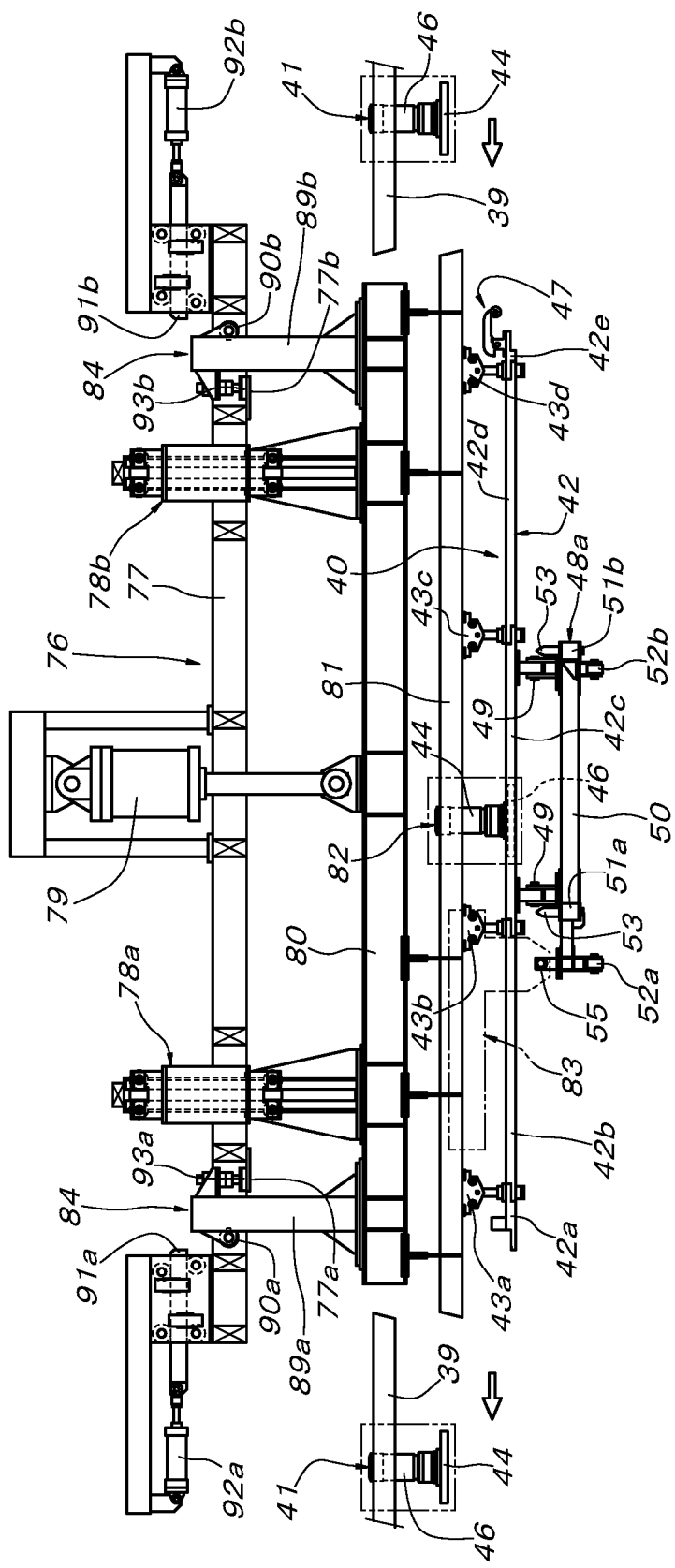
FIG. 16 is a side view showing a door conveying traveling body lifting device in the door hanger transfer section in a state where a lifting guide rail supporting the moving bodies of the auxiliary conveyors is in a descent limit position.
Figure 17:
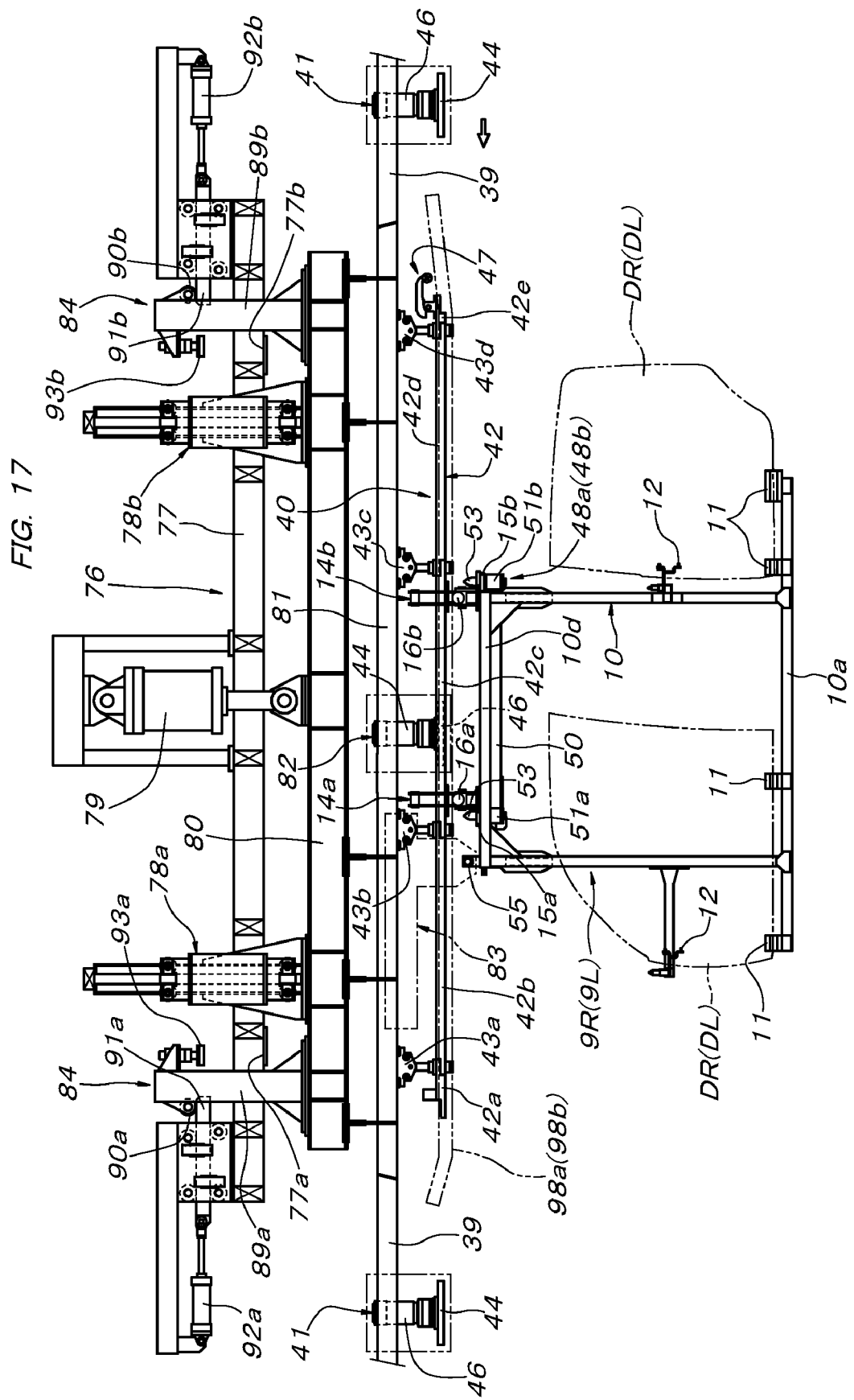
FIG. 17 is a side view showing the door conveying traveling body lifting device in the door hanger transfer section in a state where the lifting guide rail supporting the moving bodies of the auxiliary conveyors is in an ascent limit position.

On the door conveying line of the door conveying apparatus 6 sandwiched between the second door hanger transfer positions L3 of respective auxiliary conveyors 8A and 8B, a door conveying traveling body lifting device 76 ascending and descending the door conveying traveling body 40 in a fixed position on the door conveying line is juxtaposed, as shown in FIG. 10. The door conveying traveling body lifting device 76 will be described based on FIGS. 13 to 17. A pedestal frame 77 is constructed at an appropriate height above the floor to support the guide rails 21 passing through the second door hanger transfer positions L3 of both auxiliary conveyors 8A and 8B. As shown in FIG. 16 and FIG. 17, a lifting frame 80 guided vertically movably via a pair of front and rear lifting guide means 78a and 78b and lift-driven by one cylinder unit 79 is suspended from the pedestal frame 77. To the lower side of the lifting frame 80, a lifting guide rail 81 supporting the door conveying traveling body 40 and ascending and descending is constructed. The lifting guide rail 81 connects with the guide rail 39 of the door conveying apparatus 6 in the ascent limit position, and is constituted by the divided part of the guide rail 39.

The lifting guide rail 81 is provided along with drive means 82 for drawing the door conveying traveling body 40 into a fixed position on the lifting guide rail 81 from the upstream side and sending out the door conveying traveling body 40 to the downstream side, door conveying traveling body positioning means 83 for positioning the door conveying traveling body 40 in the fixed position and lock means 84 for locking the lifting guide rail 81 in the ascent limit position of connecting to the guide rail 39 of the door conveying apparatus 6 side.

Figure 19:
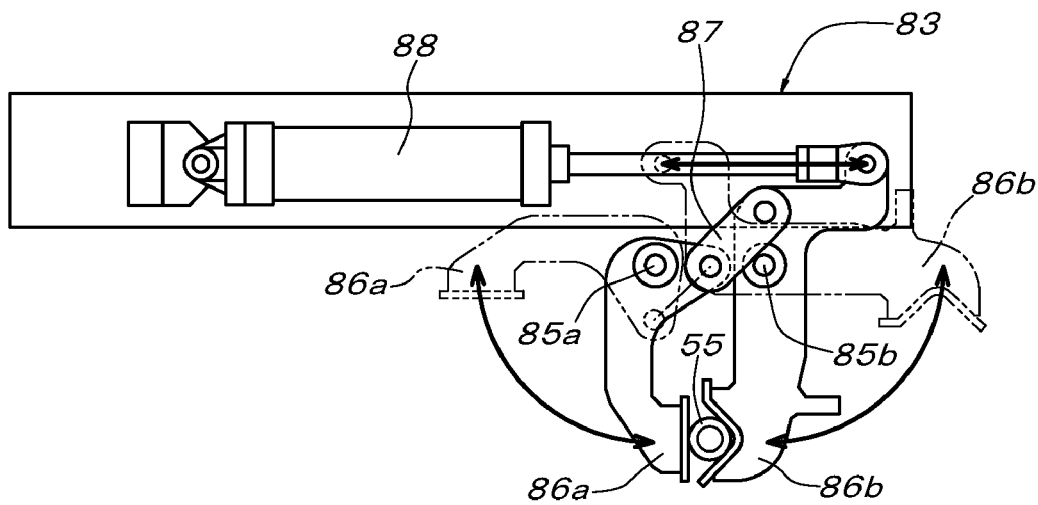
FIG. 19 is a side view showing moving body positioning means provided along with the door conveying traveling body lifting device.

The drive means 82 having the same structure as the drive means 41 for travel-driving the door conveying traveling body 40 of the door conveying apparatus 6 is used, and accordingly, the same reference numerals and letters are given and their description is omitted. The door conveying traveling body positioning means 83 constituted by, for example, as shown in FIG. 19, a pair of front and rear holding pieces 86a and 86b pivotally supported by shafts 85a and 85b vertically openably and closably so as to hold one of the paired left and right anti-sway guide rollers 55 provided to the door conveying traveling body 40 from both front and rear sides, a link 87 associatively connecting both holding pieces 86a and 86b with each other such that both holding pieces 86a and 86b make opening and closing movements in conjunction and a cylinder unit 88 open-close driving one of the holding pieces 86b can be used. As shown in FIG. 16 and FIG. 17, the lock means 84 is composed of a supported portion 90a, 90b formed of a roller pivotally supported by a transverse horizontal shaft at one lateral portion of an upper end of a column member 89a, 89b provided upright at both front and rear ends of the lifting frame 80, a movable support member 91a, 91b supported on both front and rear ends of the pedestal frame 77 horizontally in-and-out movably between a projecting position of supporting the supported portion 90a, 90b and a retreating position of being away from the supported portion 90a, 90b and a cylinder unit 92a, 92b driving the movable support member 91a, 91b. Further, the column member 89a, 89b is provided projecting with a supported portion 93a, 93b to be received by a support portion 77a, 77b provided on the pedestal frame 77 when the lifting guide rail 81 is lowered to the descent limit position.

Figure 13:
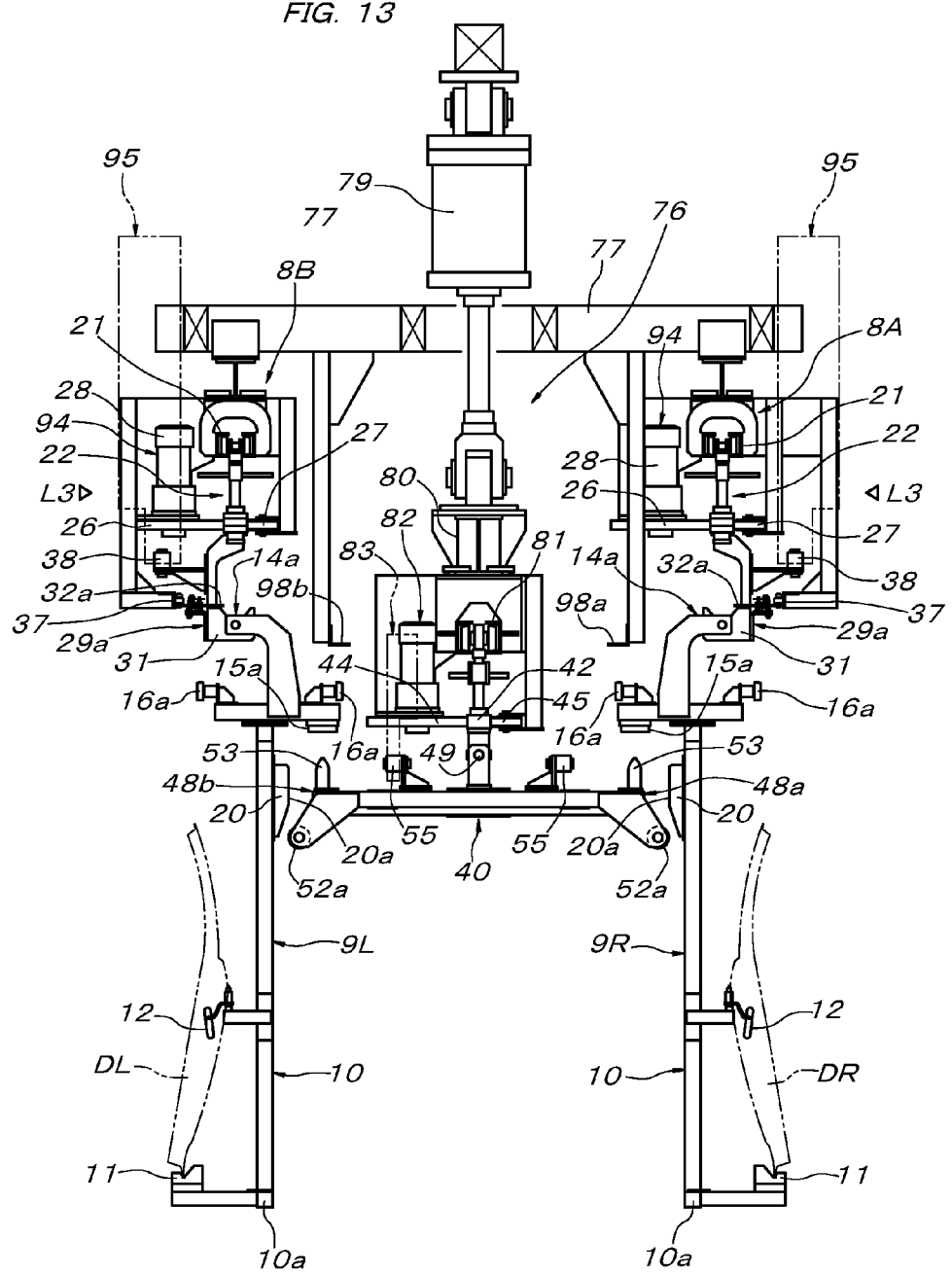
FIG. 13 is a front view showing door hanger transfer means between the door conveying traveling body and the moving bodies of the auxiliary conveyors in a state where the door hangers are suspended from the moving bodies of the auxiliary conveyors side.
Figure 14:
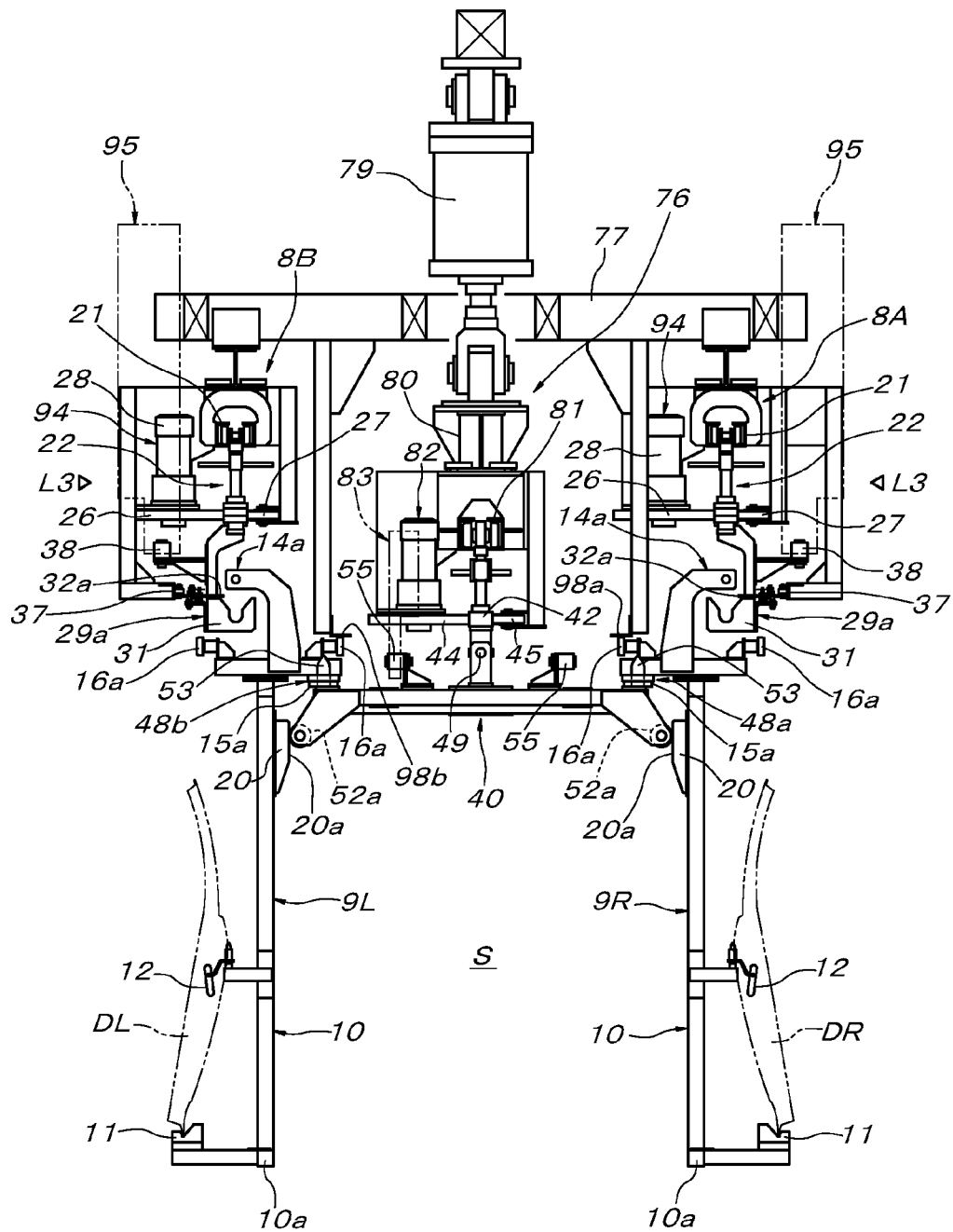
FIG. 14 is a front view showing the door hanger transfer means between the door conveying traveling body and the moving bodies of the auxiliary conveyors in a state where the door hangers are suspended from the door conveying traveling body side.
Figure 15:
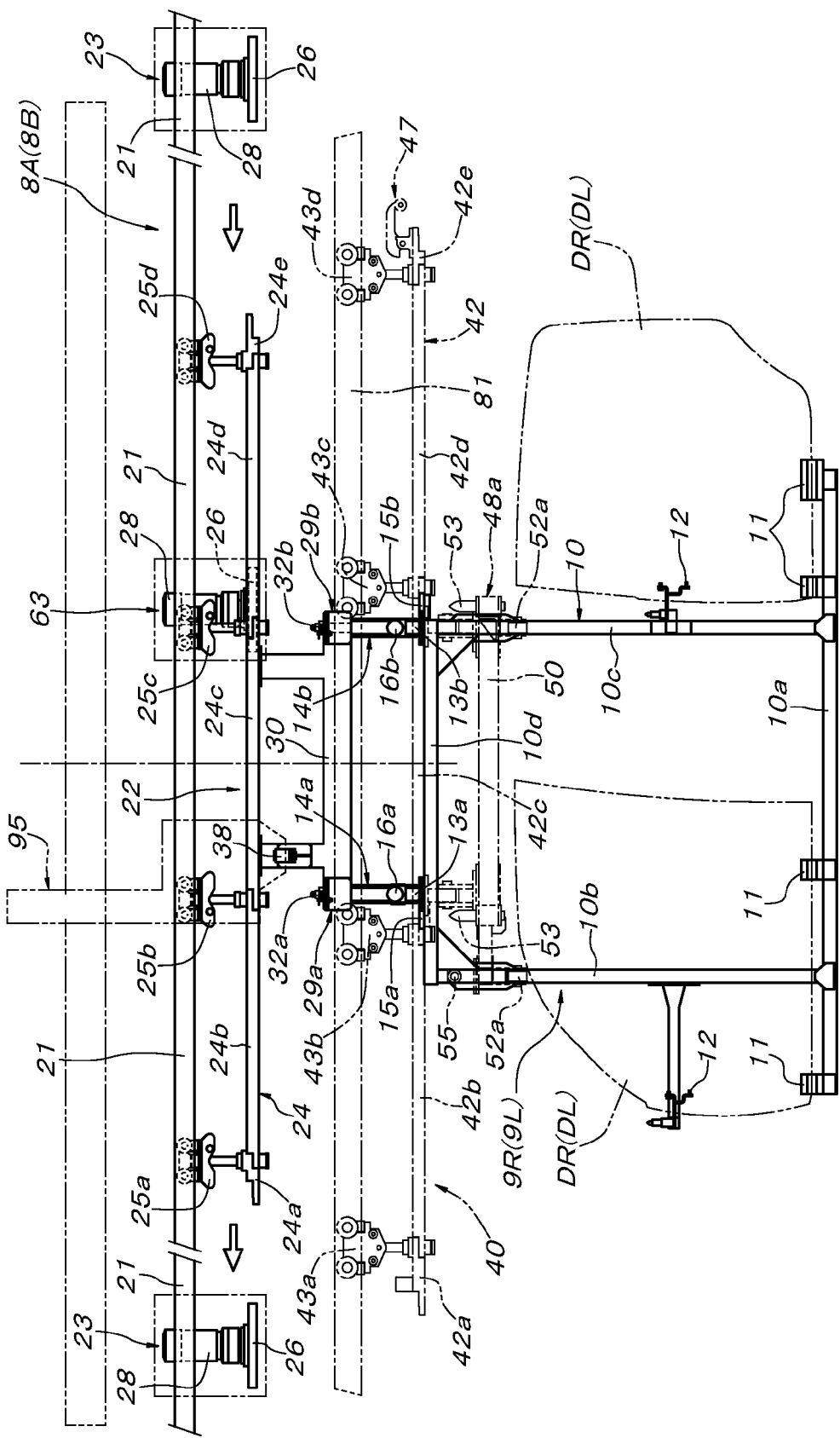
FIG. 15 is a side view showing the moving body of the auxiliary conveyor from which the door hanger is suspended in the door hanger transfer section.

Further, the second door hanger transfer position L3 of each auxiliary conveyor 8A, 8B, is provided along with drive means 94 for drawing the moving body 22 into a fixed position in the second door hanger transfer position L3 from the upstream side and sending out the moving body 22 to the downstream side and moving body positioning means 95 for positioning the moving body 22 in the fixed position, as shown in FIGS. 13 to 15. The drive means 94 having the same structure as the drive means 23 for travel-driving the moving body 22 in the auxiliary conveyor 8A, 8B is used, and accordingly, the same reference numerals and letters are given and their description is omitted. The moving body positioning means 95 is identical to the moving body positioning means 64 provided to the lifting body 57 of the lifting device 7A, 7B (see FIG. 18).

A brief description about usage of door conveying equipment configured as above will be given first. As shown in FIG. 1, a vehicle body B having been sent out from a painting process in a state where doors DR, DL are mounted on both left and right sides are conveyed to a predetermined position within the door detaching work area 3 by a floor conveyor of the vehicle body conveying line for door detachment 1. Inside this door detaching work area 3, the doors DR, DL are detached from both left and right sides of the vehicle body B by workers or door detaching robots on both left and right sides of the vehicle conveying line for door detachment 1. The vehicle body B whose doors DR, DL have been detached is sent out by the floor conveyor of the vehicle body conveying line for door detachment 1.

On the other hand, empty door hangers 9R and 9L are sent into the door detaching work area 3 by the door conveying traveling body 40 of the door conveying apparatus 6, herein transferred from the door conveying traveling body 40 to the moving bodies 22 of the auxiliary conveyors 8A and 8B, and conveyed to the lifting devices 7A and 7B by the moving bodies 22, thereafter lowered together with the moving bodies 22 to the door loading positions on the floor side by the lifting devices 7A and 7B. The right side doors DR and left side doors DL having been detached from both left and right sides of the vehicle body B as described above are loaded on the empty door hanger 9R for the right side doors and the empty door hanger 9L for the left side doors having been lowered to the door loading positions, respectively. The door conveying traveling body 40 of the door conveying apparatus 6 having become empty by transferring the door hangers 9R and 9L to the moving bodies 22 of the auxiliary conveyors 8A and 8B waits in a fixed position without moving within the door detaching work area 3. The door hangers 9R and 9L on which the doors DR and DL have been loaded are returned to the conveying lines of the auxiliary conveyors 8A and 8B with the moving bodies 22 by the lifting devices 7A and 7B again, and travel to positions adjoining the waiting empty door conveying traveling body 40.

Subsequently, the door hangers 9R and 9L having been loaded with the doors DR and DL are returned from the moving bodies 22 of the auxiliary conveyors 8A and 8B to the door conveying traveling body 40 which is waiting in the door detaching work area 3 after having conveyed the door hangers 9R and 9L into the door detaching work area 3. Thus, the right side doors DR detached from the right side of the vehicle body B are loaded, in a state of being supported by the door hanger 9R for the right side doors, on the hanger supporting portion 48a having supported the empty door hanger 9R for the right side doors of the door conveying traveling body 40 having conveyed the empty door hangers 9R and 9L into the door detaching work area 3, via the lifting device 7A and the auxiliary conveyor 8A handling the right side doors in the door detaching work area 3. The left side doors DL detached from the left side of the vehicle body B are loaded, in a state of being supported by the door hanger 9L for the left side doors, on the hanger supporting portion 48b having supported the empty door hanger 9L for the left side doors of the door conveying traveling body 40 having conveyed the empty door hangers 9R and 9L into the door detaching work area 3, via the lifting device 7B and the auxiliary conveyor 8B handling the left side doors in the door detaching work area 3.

The door conveying traveling body 40 supporting the door hangers 9R and 9L, on which respective doors DR and DL have been loaded, on the hanger supporting portion 48a and 48b on both left and right sides thereof is sent into the outfitting work area 5, within which outfitting work relative to the doors DR and DL is carried out. Since the outfitting work is carried out relative to the doors DR and DL in a state of being kept loaded on the door hangers 9R and 9L supported by the hanger supporting portions 48a and 48b of the door conveying traveling body 40, a traveling level of the door conveying traveling body 40 inside the outfitting work area 5 is lowered to a level in which the outfitting work is easily carried out.

The door hangers 9R and 9L supporting the doors DR and DL having been fitted out are conveyed to a fixed position inside the door attaching work area 4 in a state of being supported on both left and right sides of the door conveying traveling body 40, as shown in FIG. 1. Herein, the door hangers 9R and 9L are transferred to the moving bodies 22 of the auxiliary conveyors 8A and 8B on both left and right sides, conveyed to the lifting devices 7A and 7B by these moving bodies 22, thereafter lowered to the door unloading positions on the floor side by the lifting devices 7A and 7B. More specifically, the door hanger 9R for the right side doors supporting the right side doors DR is lowered to the door unloading position on the right side of the vehicle body B on the vehicle body conveying line for door attachment 2 on the floor side via the auxiliary conveyor 8A and lifting device 7A on the right side of the vehicle body B on the vehicle body conveying line for door attachment 2 on the floor side. The door hanger 9L for the left side doors supporting the left side doors DL is lowered to the door unloading position on the left side of the vehicle body B on the vehicle body conveying line for door attachment 2 on the floor side via the auxiliary conveyor 8B and lifting device 7B on the left side of the vehicle body B on the vehicle body conveying line for door attachment 2 on the floor side.

On the vehicle body conveying line for door attachment 2, the vehicle body B to be mounted with the doors DR and DL lowered to the door unloading positions on both left and right sides of the vehicle body conveying line in a state of being supported by the door hangers 9R and 9L are conveyed in fixed positions inside the door attaching work area 4. Thus, an operation of unloading the doors DR and DL from the door hangers 9R and 9L having been lowered to the door unloading positions on the floor side by the lifting devices 7A and 7B and an operation of attaching the doors DR and DL to both left and right sides of the vehicle body B on the vehicle body conveying line for door attachment 2 are performed on both left and right sides of the vehicle body B by workers or door detaching robots. It is noted that the vehicle body conveying line for door detachment 1 and the vehicle body conveying line for door attachment 2 can be connected so as to be continued with each other or connected via vehicle transfer means for transferring the vehicle body B between both lines 1 and 2 in order that the vehicle body B whose doors DR and DL have been detached in the door detaching work area 3 is sent into a fixed position in the door attaching work area 4 at a timing when the detached doors DR and DL are returned to the door attaching work area 4 after the outfitting work in the outfitting work area 5.

In the door attaching work area 4, the door hangers 9R and 9L having become empty by unloading the doors DR and DL as described above are returned, via the lifting devices 7A and 7B and the auxiliary conveyors 8A and 8B, to the empty door conveying traveling body 40 waiting in the as-is position after the door hangers 9R and 9L have been transferred to the moving bodies 22 of the auxiliary conveyors 8A and 8B. The door hangers 9R and 9L are conveyed again to the door detaching work area 3 by the door conveying traveling body 40, and provided for conveyance to the outfitting work area 5 of the doors DR and DL detached from the vehicle body B on the vehicle body conveying line for door detachment 1 inside the door detaching work area 3.

Subsequently, operation in each of the above-described devices will be described in detail. By the configuration as described above, the lifting device 7A, 7B forwardly and reversely rotates the wrapping transmission device 61 by the lifting drive means 59, and makes the lifting body 57 move up and down along the lifting guide column 56, whereby the moving body 22 of the auxiliary conveyor 8A, 8B having transferred on the lifting guide rail 58 supported by the lifting body 57 moves up and down between the door loading/unloading position L1 of the descent limit position and the first door hanger transfer position L2 of the ascent limit position. At this time, the moving body 22 of the auxiliary conveyor 8A, 8B having transferred on the lifting guide rail 58 ascends and descends on a side in which the vehicle body conveying line for door detachment 1 or the vehicle body conveying line for door attachment 2 is located, relative to the lifting guide column 56, as shown in FIG. 10. The door hanger 9R, 9L suspended from the hanger suspending portion 29a, 29b of the moving body 22 via the suspended portion 14a, 14b supports the doors DR, DL on a side opposite to a side in which the lifting guide column 56 is located, relative to the suspension frame 10 (i.e. on a side in which the vehicle body conveying line for door detachment 1 or the vehicle body conveying line for door attachment 2 is located). At this time, as shown, the doors DR, DL are supported by the door hanger 9R, 9L with the inner surface thereof in an inside-out orientation, i.e. in the opposite orientation to an orientation facing the side in which the vehicle body conveying line for door detachment 1 or the vehicle body conveying line for door attachment 2 is located, thus, to an orientation mounted on the vehicle body B on the vehicle body conveying line for door detachment 1 or the vehicle body conveying line for door attachment 2.

The door hanger 9R, 9L is suspended laterally swingably about the shaft body 17 fitted to the hook member 31 of the hanger suspending portion 29a, 29b of the moving body 22 side. When the moving body 22 suspending this door hanger 9R, 9L is transferred on the lifting guide rail 58 of the lifting device 7A, 7B, however, the pair of left and right anti-sway guide rails 71a and 71b provided along with the lifting guide rail 58 are located on the guide rollers 16a, 16b of the door hanger 9R, 9L side and prevent the door hanger 9R, 9L from swinging laterally about the shaft body 17, as shown in FIG. 11.

Furthermore, as shown in FIG. 11 and FIG. 12, the moving body 22 on the lifting guide rail 58 is positioned in a fixed position on the lifting guide rail 58 by the moving body positioning means 64, and thus the moving body 22 (the door hanger 9R, 9L) cannot freely move in the longitudinal direction of the lifting guide rail 58. The moving body positioning means 64 is such that the pair of front and rear holding pieces 68a and 68b are closed by extending movement of a piston rod of the cylinder unit 70 and the positioning held portion (vertical shaft roller) 38 of the moving body 22 side is held between both holding pieces 68a and 68b from the front and rear sides, as shown in FIG. 18. In the course of this holding process, the moving body 22 can be positioned in a fixed position.

The anti-swing operation relative to the door hanger 9R, 9L by the anti-sway guide rail 71a, 71b and guide rollers 16a, 16b and the positioning operation of the moving body 22 by the moving body positioning means 64 allow the process of vertically moving the moving body 22 by the lifting device 7A, 7B between the door loading/unloading position L1 and the first door hanger transfer position L2 to be carried out safely.

Additionally, the moving body 22 suspending the empty door hanger 9R, 9L or the door hanger 9R, 9L supporting the doors DR, DL having been fitted out moves down to the door loading/unloading position L1 in the lifting device 7A, 7B. At this time, as shown in FIG. 10 and FIG. 12, it is configured such that the two front and rear places of the lower end forward and rearward direction frame member 10a in the suspension frame 10 of the door hanger 9R, 9L are fitted into upper end bifurcated portions 97 of hanger anti-sway members 96a and 96b provided upright on the floor, respectively, and the lower end of the door hanger 9R, 9L does not swing laterally. By this, combined with the anti-swing operation relative to the door hanger 9R, 9L by the anti-sway guide rail 71a, 71b and guide rollers 16a, 16b, the loading operation or unloading operation of the doors DR, DL relative to the door hanger 9R, 9L suspended from the moving body 22 can easily and safely be performed.

The transfer of the door hanger 9R, 9L supporting the doors DR, DL or the empty door hanger 9R, 9L between the lifting device 7A, 7B and the auxiliary conveyor 8A, 8B is carried out in the following manner; the lifting body 57 (the lifting guide rail 58) of the lifting device 7A, 7B is moved up by the lifting drive means 59, and the moving body 22 is raised to the first door hanger transfer position L2 at a predetermined height above the floor. As a result, as shown in FIG. 12, the lifting guide rail 58 of the lifting device 7A, 7B side connects with the guide rail 21 of the auxiliary conveyor 8A, 8B, thereupon activating the lock means 66 to lock the lifting body 57 (the lifting guide rail 58) in the first door hanger transfer position L2. More specifically, the movable fitting member 74a, 74b whose height is fixed by the cylinder unit 75a, 75b of each front and rear lock means 66 is advanced, a distal end thereof is fitted into the fitted portion 72a, 72b of the lifting body 57 (the horizontal beam 57a) side, the lifting guide rail 58 connects with the guide rail 21 of the auxiliary conveyor 8A, 8B, and in this state, the lifting body 57 is locked.

After the completion of locking of the lifting body 57 (the lifting guide rail 58) by the lock means 66, the drive means 63 of the lifting body 57 side is activated to send out the moving body 22 on the lifting guide rail 58 onto the downstream side guide rail 21 of the auxiliary conveyor 8A, 8B or to draw the moving body 22 sent in on the lifting guide rail 58 from the upstream side guide rail 21 to a fixed position. It is a matter of course that when the moving body 22 is sent out from on the lifting guide rail 58, the positioning of the moving body 22 by the moving body positioning means 64 is released immediately therebefore and that when the moving body 22 is drawn on the lifting guide rail 58, the drawn moving body 22 is positioned in a fixed position by the moving body positioning means 64 immediately thereafter.

In the case of the conveyance of the door hanger 9R, 9L by the auxiliary conveyor 8A, 8B and the lifting of the door hanger 9R, 9L by the lifting device 7A, 7B, the stopper 32a, 32b provided along with the hanger suspending portion 29a, 29b of the moving body 22 is held by biasing force of the torsion coil spring 34 in a closed position in which the upper side opening portion of the hook member 31 is closed, as shown in FIG. 4B and FIG. 5C. Therefore, there is no possibility that the shaft body 17 in the suspended portion 14a, 14b of the door hanger 9R, 9L side is accidentally detached from the hook member 31 in the hanger suspending portion 29a, 29b of the moving body 22 side.

The transfer of the door hanger 9R, 9L supporting the doors DR, DL from the moving body 22 of the auxiliary conveyor 8A, 8B to the door conveying traveling body 40 of the door conveying apparatus 6 in the door detaching work area 3, or the transfer of the empty door hanger 9R, 9L from the moving body 22 of the auxiliary conveyor 8A, 8B to the door conveying traveling body 40 of the door conveying apparatus 6 in the door attaching work area 4 is carried out in the following manner; the moving body 22 of the auxiliary conveyor 8A, 8B side sent into the second door hanger transfer position L3 configured on both left and right sides of the door conveying traveling body positioning means 83 on the door conveying line of the door conveying apparatus 6 is drawn into a predetermined position by the drive means 94 provided along with the second door hanger transfer position L3 and stops, thereafter being positioned in a fixed position by the moving body positioning means 95 to be secured. The moving body positioning means 95 functions in the same manner as the moving body positioning means 64 provided to the lifting device 7A, 7B. Further, as shown in FIG. 13 and FIG. 14, the cam rail 37 (see FIG. 5B) is arranged in the second door hanger transfer position L3. When the moving body 22 is sent into the second door hanger transfer position L3, the stopper 32a, 32b provided along with the hanger suspending portion 29a, 29b of the moving body 22 is shifted to a release position of being away laterally from the upper side opening portion of the hook member 31, as shown by the phantom lines in FIG. 4B and FIG. 5C.

On the other hand, the door conveying traveling body lifting device 76 is waiting in a state where the lifting frame 80 is raised to the ascent limit position by contracting movement of a piston rod of the cylinder unit 79 and the lifting guide rail 81 is connected to the guide rail 39 of the door conveying apparatus 6, as shown in FIG. 17. At this time, as shown, the movable supporting member 91a, 91b is shifted to an advance limit position by the cylinder unit 92a, 92b of the lock means 84, and the distal end of the movable supporting member 91a, 91b supports the supported portion 90a, 90b of the lifting frame 80 side, whereby the lifting guide rail 81 is held in the ascent limit position.

When the empty door conveying traveling body 40 of the door conveying apparatus 6 is sent into a fixed position on the lifting guide rail 81 held in the ascent limit position of the door conveying traveling body lifting device 76 by the drive means 41 at the upstream side and the drive means 82 provided along with the lifting guide rail 81, the door conveying traveling body 40 is positioned in the fixed position by the door conveying traveling body positioning means 83 provided along with the lifting guide rail 81. More specifically, as shown in FIG. 19, the pair of front and rear holding pieces 86a and 86b are closed by extending movement of a piston rod of the cylinder unit 88, and then the anti-sway guide roller 55 of the door conveying traveling body 40 side is held between both holding pieces 86a and 86b from the front and rear sides and the door conveying traveling body 40 is positioned in the fixed position in the course of this holding process. After that, as shown in FIG. 16, the lifting frame 80 is lowered to the descent limit position by the extending movement of a piston rod of the cylinder unit 79 in a state where the movable supporting member 91a, 91b is shifted by the cylinder unit 92a, 92b of the lock means 84 to a retreat limit position departing from the supported portion 90a, 90b of the lifting frame 80 side. The supported portion 93a, 93b of the column member 89a, 89b is received by the support portion 77a, 77b of the pedestal frame 77 side, and the lifting guide rail 81 is held in the descent limit position. Thus, the empty door conveying traveling body 40 having transferred to the fixed position on the lifting guide rail 81 of the door conveying traveling body lifting device 76 comes to wait in a waiting position lowered by a specific height from the traveling level.

The empty door conveying traveling body 40 waiting in the fixed position on the lifting guide rail 81 in the descent limit position of the door conveying traveling body lifting device 76 as described above is such that, as shown in FIG. 13, the hanger supporting portions 48a and 48b on both left and right sides thereof are away below the supported portions 15a and 15b of the door hangers 9R and 9L suspended respectively by the moving bodies 22 of the auxiliary conveyors 8A and 8B side sent into the second door hanger transfer positions L3 on both left and right sides of the empty door conveying traveling body 40, the empty door conveying traveling body 40 and the moving bodies 22 suspending the door hangers 9R and 9L are in a state capable of relatively traveling without interfering with each other, and thus the moving bodies 22 of the auxiliary conveyors 8A and 8B side suspending respective door hangers 9R and 9L can be sent into the second door hanger transfer positions L3 in which the empty door conveying traveling body 40 is waiting as above, thereupon allowing the positioning.

After the moving bodies 22 of the auxiliary conveyors 8A and 8B side are sent into the second door hanger transfer positions L3 in which the empty door conveying traveling body 40 is waiting, and are positioned by the moving body positioning means 95, as shown in FIG. 17, the lifting guide rail 81 (the lifting frame 80) of the door conveying traveling body lifting device 76 is moved up to the ascent limit position by the cylinder unit 79. As a result, as shown in FIG. 14, in the course of the moving-up process of the door conveying traveling body 40 on the lifting guide rail 81, the door hangers 9R and 9L suspended by the moving bodies 22 in the second door hanger transfer positions L3 of the auxiliary conveyors 8A and 8B on both left and right sides are transferred to the hanger supporting portions 48a and 48b on both left and right sides of the door conveying traveling body 40. More specifically, as shown in FIG. 9, the support member 51a, 51b of the hanger supporting portion 48a, 48b lifts up the supported portion 15a, 15b of the door hanger 9R, 9L side in a state where the vertical pin 53 of the hanger supporting portion 48a, 48b is fitted into the fitted bore 19 of the supported portion 15a, 15b of the door hanger 9R, 9L side. At this time, the abutting portion (the roller) 52a, 52b provided along with the hanger supporting portion 48a, 48b abuts against the abutted surface 20a of the door hanger 9R, 9L side to prevent the door hanger 9R, 9L from tilting inside. Therefore, each door hanger 9R, 9L is transferred to the hanger supporting portion 48a, 48b on both left and right sides of the door conveying traveling body 40 in a state of the suspension frame 10 hanging substantially vertically.

Figure 9:
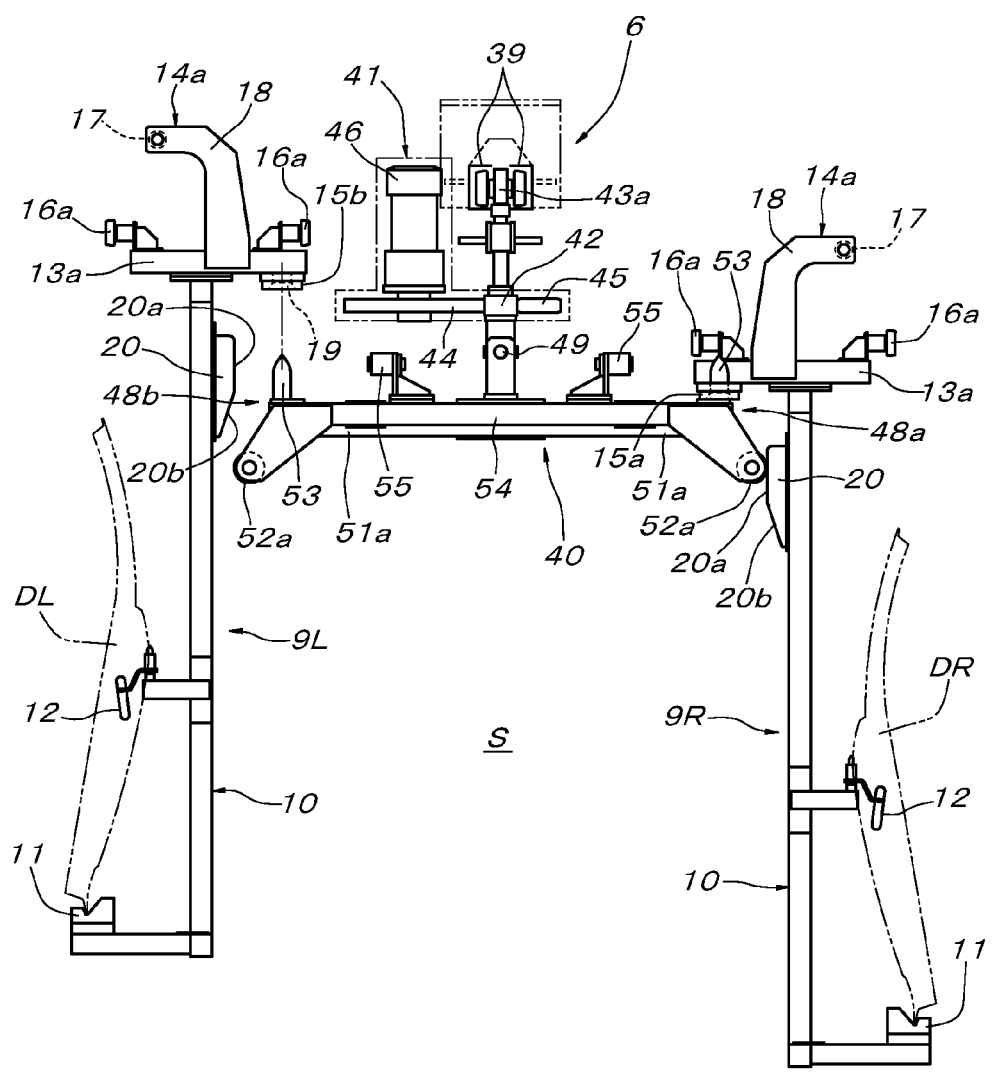
FIG. 9 is a front view showing the door conveying traveling body and the door hangers suspended therefrom.

The door hangers 9R and 9L supported by the hanger supporting portions 48a and 48b on both left and right sides of the door conveying traveling body 40 respectively as described above are suspended in a state of substantially perpendicularly hanging on both left and right sides of the door conveying traveling body 40 only by upper end inside portions of the suspension frames 10, as shown in FIG. 9 and FIG. 14, so that the topside is closed by the door conveying traveling body 40 including the hanger supporting portions 48a and 48b and both left and right sides are closed by the door hangers 9R and 9L hanging from the door conveying traveling body 40, thereby coming into a space S formed between both door hangers 9R and 9L in which the downside and traveling-direction both front and rear sides of the door conveying traveling body 40 are opened. Further, the door hanger 9R, 9L and the door conveying traveling body 40 are configured such that upper ends of the doors DR, DL supported by the door hanger 9R, 9L are located lower than the door conveying traveling body 40 including the hanger supporting portions 48a and 48b.

A height above the floor of the traveling path of the door conveying traveling body 40 is set such that lower ends of the doors DR, DL supported by the door hanger 9R, 9L are located near the floor in a specific area such as the outfitting work area 5 so as to be advantageous for component attaching work to the doors DR, DL within the outfitting work area 5 or for maintenance work for the door hanger 9R, 9L and the door conveying traveling body 40 supporting the door hanger. In this situation, a space S with a sufficiently high height above the floor can be ensured between both door hangers 9R and 9L. Furthermore, the space S has the downside and the traveling-direction both front and rear sides of the door conveying traveling body 40 opened. Accordingly, workers can stand on the floor between both door hangers 9R and 9L hanging on both left and right sides of the door conveying traveling body 40 and carry out necessary work without stopping the traveling of the door conveying traveling body 40. Further, by the traveling of the door conveying traveling body 40, the space S between both door hangers 9R and 9L comes to form a passage space along the traveling direction of the door conveying traveling body 40. This passage space can be used as a passage for component supply trucks in the outfitting work area or for workers. Additionally, equipment such as a fixed shelf can be arranged on the floor of the passage space, according to need.

On the other hand, as shown in FIG. 14 and FIG. 17, there can be constructed a pair of left and right guide rails 98a and 98b abutting against, in such a manner as to cover, the inner side guide rollers 16a and 16b of the guide rollers 16a, 16b on both left and right sides of the suspended door hanger 9R, 9L when the door conveying traveling body 40 suspending the door hangers 9R and 9L by the hanger supporting portions 48a and 48b on both left and right sides thereof is moved up to the ascent limit position by the lifting guide rail 81 (lifting frame 80) as described above.

When the transfer of the door hangers 9R and 9L supporting the doors DR, DL from the moving bodies 22 of the auxiliary conveyors 8A and 8B to the door conveying traveling body 40 of the door conveying apparatus 6 in the door detaching work area 3 is completed, the door conveying traveling body 40 on the lifting guide rail 81 in the ascent limit position of the door conveying traveling body lifting device 76 is sent out downstream by the drive means 82 after the release of the positioning by the door conveying traveling body positioning means 83, and is caused to travel to the outfitting work area 5, thereby allowing the doors DR, DL for one vehicle body to be sent into the outfitting work area 5 via the door hangers 9R and 9L supported by one unit of the door conveying traveling body 40. On the other hand, the moving bodies 22 of the auxiliary conveyors 8A and 8B side having become empty are made to wait without moving in the second door hanger transfer positions L3 and then to receive the empty door hangers 9R and 9L from the door conveying traveling body 40 sent into the door conveying traveling body lifting device 76, as described below.

The door conveying traveling body 40 of the door conveying apparatus 6 having received the empty door hangers 9R and 9L from the moving bodies 22 of the auxiliary conveyors 8A and 8B in the door attaching work area 4 is sent out downstream from the lifting guide rail 81 in the ascent limit position of the door conveying traveling body lifting device 76 as described above and is caused to travel to the door detaching work area 3, thereby allowing the empty door hangers 9R and 9L to be sent into the door detaching work area 3. The empty door hangers 9R and 9L are transferred to the empty moving bodies 22 of the auxiliary conveyors 8A and 8B side waiting in the second door hanger transfer positions L3 as described above. On the other hand, the moving bodies 22 of the auxiliary conveyors 8A and 8B side having become empty are made to wait without moving in the second door hanger transfer positions L3 and then to receive the door hangers 9R and 9L supporting the doors DR, DL from the door conveying traveling body 40 sent into the door conveying traveling body lifting device 76, as described below.

The transfer of the empty door hangers 9R and 9L from the door conveying traveling body 40 of the door conveying apparatus 6 to the moving bodies 22 of the auxiliary conveyors 8A and 8B in the door detaching work area 3, or the transfer of the door hangers 9R and 9L supporting the doors DR, DL from the door conveying traveling body 40 of the door conveying apparatus 6 to the moving bodies 22 of the auxiliary conveyors 8A and 8B in the door attaching work area 4 can be carried out in a reverse procedure of the above. More specifically, the door conveying traveling body 40 supporting the door hangers 9R and 9L on both left and right sides is sent by the drive means 82 into a fixed position on the lifting guide rail 81 having been locked by the lock means 84 in the ascent limit position of the door conveying traveling body lifting device 76, is positioned by the door conveying traveling body positioning means 83, and in this state, is made to wait at the same level as the traveling level in the door conveying line.

On the other hand, the empty moving bodies 22 of the auxiliary conveyors 8A and 8B side are sent into the second door hanger transfer positions L3 by the drive means 94 as described above. At this time, however, as shown in FIG. 14, the hanger suspending portions 29a and 29b (the hook members 31) of the empty moving bodies 22 come to move in a space between the suspended portions 14a and 14b of the door hangers 9R and 9L supported on both left and right sides of the door conveying traveling body 40 waiting on the lifting guide rail 81 in the ascent limit position of the door conveying traveling body lifting device 76 as described above and the horizontal members 13a and 13b below the suspended portions 14a and 14b, and accordingly, the door hangers 9R and 9L supported on both left and right sides of the door conveying traveling body 40 and the empty moving bodies 22 cannot interfere with each other. Consequently, it is also possible to send the empty moving bodies 22 of the auxiliary conveyors 8A and 8B side into the second door hanger transfer positions L3 and make them wait first and then to send the door conveying traveling body 40 of the door conveying apparatus 6 onto the lifting guide rail 81 in the ascent limit position of the door conveying traveling body lifting device 76. It is noted that the empty moving bodies 22 having been sent into the second door hanger transfer positions L3 are positioned in the fixed positions by the moving body positioning means 95 as described above, and the stoppers 32a and 32b provided along with the hanger suspending portions 29a and 29b are shifted to the release positions shown by the phantom lines in FIG. 4B and FIG. 5C by the cam rail 37.

After the empty moving bodies 22 of the auxiliary conveyors 8A and 8B side are positioned in the fixed positions in the second door hanger transfer positions L3 and the door conveying traveling body 40 of the door conveying apparatus 6 side supporting the door hangers 9R and 9L on both left and right sides thereof is positioned in the fixed position on the lifting guide rail 81 in the ascent limit position of the door conveying traveling body lifting device 76, the lifting guide rail 81 of the door conveying traveling body lifting device 76 is moved down to the descent limit position in the manner as described above. Then, in the course of the moving-down process of the door conveying traveling body 40 on the lifting guide rail 81, as shown in FIG. 13, the suspended portions 14a and 14b (the shaft bodies 17) of the door hangers 9R and 9L supported on both left and right sides of the door conveying traveling body 40 are fitted into the hanger suspending portions 29a and 29b (the hook members 31) of the empty moving bodies 22. After that, the hanger supporting portions 48a and 48b of the door conveying traveling body 40 side move apart downward from the supported portions 15a and 15b of the door hangers 9R and 9L side, the door hangers 9R and 9L supported on both left and right sides of the door conveying traveling body 40 of the door conveying apparatus 6 side are transferred to the moving bodies 22 of the auxiliary conveyors 8A and 8B side.

After completion of the transfer of the empty door hangers 9R and 9L from the door conveying traveling body 40 of the door conveying apparatus 6 to the moving bodies 22 of the auxiliary conveyors 8A and 8B in the door detaching work area 3, the door conveying traveling body 40 on the lifting guide rail 81 in the descent limit position of the door conveying traveling body lifting device 76 is made to wait without moving, and then to receive the door hangers 9R and 9L supporting the doors DR, DL from the moving bodies 22 of the auxiliary conveyors 8A and 8B side sent into the second door hanger transfer positions L3 as described above. The moving bodies 22 of the auxiliary conveyors 8A and 8B side having received the empty door hangers 9R and 9L are sent out downstream by the drive means 94 after the release of the positioning by the moving body positioning means 95, and are transferred to the lifting devices 7A and 7B in the first door hanger transfer positions L2, whereupon the empty door hangers 9R and 9L can be sent into the door loading positions on the floor side together with the moving bodies 22.

After completion of the transfer of the door hangers 9R and 9L supporting the doors DR, DL from the door conveying traveling body 40 of the door conveying apparatus 6 to the moving bodies 22 of the auxiliary conveyors 8A and 8B in the door attaching work area 4, the door conveying traveling body 40 on the lifting guide rail 81 in the descent limit position of the door conveying traveling body lifting device 76 is made to wait without moving and then to receive the empty door hangers 9R and 9L from the moving bodies 22 of the auxiliary conveyors 8A and 8B side sent into the second door hanger transfer positions L3 as described above. The moving bodies 22 of the auxiliary conveyors 8A and 8B side having received the door hangers 9R and 9L supporting the doors DR, DL are sent out downstream in the above-described manner, and are transferred to the lifting devices 7A and 7B in the first door hanger transfer positions L2, whereupon the door hangers 9R and 9L supporting the doors DR, DL can be sent into the door unloading positions on the floor side together with the moving bodies 22.

On the other hand, the moving bodies 22 of the auxiliary conveyors 8A and 8B execute a horizontal U-turn in the traveling path from the first door hanger transfer positions L2 adjoining the lifting devices 7A and 7B to the second door hanger transfer positions L3 in which the transfer of the door hangers 9R and 9L is carried out between the moving bodies and the door conveying traveling body 40 on the lifting guide rail 81 of the door conveying traveling body lifting device 76. Since the traveling direction in the first door hanger transfer position L2 and the traveling direction in the second door transfer position L3 are opposite to each other, in the door loading/unloading positions L1 which are the descent limit positions of the lifting devices 7A and 7B, the door hanger 9R for the right side doors and the door hanger 9L for the left side doors face each other inside of which the doors DR, DL are supported, whereas in the second door hanger transfer positions L3, the door hanger 9R for the right side doors and the door hanger 9L for the left side doors face in the opposite directions and thus the doors DR, DL come to be supported outside both door hangers 9R and 9L. When both door hangers 9R and 9L are transferred to the hanger supporting portions 48a and 48b on both left and right sides of the door conveying traveling body 40 placed midway between both door hangers 9R and 9L, the doors DR, DL come to be placed outside the door hangers 9R and 9L supported on both left and right sides of the door conveying traveling body 40. Moreover, as described above, the doors DR, DL are supported with inner surfaces thereof outward-directed when viewed from the door hangers 9R and 9L. As a result, the outfitting work relative to mainly the door inner surfaces of the doors DR, DL conveyed by the door conveying traveling body 40 can be carried out easily.

Further, the door hangers 9R and 9L are supported by the door hanger supporting portions 48a and 48b on both left and right sides of the door conveying traveling body 40 only by the supported portions 15a and 15b at the upper ends thereof, and hang substantially vertically. In other words, support portions for supporting or positioning the lower end portions of the door hangers 9R and 9L are not provided to the door conveying traveling body 40 side. Consequently, as shown in FIG. 14, a space continuing to the floor and utilizable as a passage for maintenance work or component trucks moving on the floor can be ensured in the middle of the door hangers 9R and 9L supported on both left and right sides of the door conveying traveling body 40 and the downside of the door conveying traveling body 40.

It should be understood that the above-described embodiment merely shows an example of door conveying equipment using the door conveying apparatus according to the present invention, and the use form of the door conveying apparatus according to the present invention is not restricted to the above-described embodiment.

INDUSTRIAL APPLICABILITY

The door conveying apparatus of the present invention can be used as means for conveying doors detached from a vehicle body, and in particular, as door conveying means in an outfitting work area where a variety of components are mounted on the doors, in a motor vehicle manufacturing line.

REFERENCE SIGNS LIST

B: Vehicle body
DR, DL: Door
L1: Door loading/unloading position
L2: First door hanger transfer position
L3: Second door hanger transfer position
S: Space between door hangers
1: Vehicle body conveying line for door detachment
2: Vehicle body conveying line for door attachment 3: Door detaching work area
4: Door attaching work area
5: Outfitting work area
6: Door conveying apparatus
7A, 7B: Lifting device
8A, 8B: Auxiliary conveyor
9R, 9L: Door hanger
10: Suspension frame
10a: Lower end forward and rearward direction frame member
11: Door bottom portion support
12: Door hinge portion support
14a, 14b: Suspended portion
15a, 15b: Supported Portion
16a, 16b: Guide roller
17: Shaft body
18: Pair of front and rear supporting plates
19: Fitted bore
20: Guide member
20a: Abutted surface
21, 39: Guide rail
22: Moving body
23, 41, 63, 82, 94: Drive means
24, 42: Load bar
25a-25d, 43a-43d: Trolley
29a, 29b: Door hanger suspending portion
31: Hook member
32a, 32b: Stopper
37: Cam rail for stopper control
38: Positioning held portion
40: Door conveying traveling body
48a, 48b: Door hanger supporting portion
50: Suspended frame
51a, 51b: Support member
52a, 52b: Abutting portion (Roller)
53: Vertical pin
57: Lifting body
58, 81: Lifting guide rail
59: Lifting drive means
64, 95: Moving body positioning means
65: Swing blocking means
66, 84: Lock means
71a, 71b: Anti-sway guide rail
76: Door conveying traveling body lifting device
77: Pedestal frame
78a, 78b: Lifting guide means
79: Cylinder unit
80: Lifting frame
83: Door conveying traveling body positioning means
96a, 96b: Door hanger anti-sway member
97: Upper end bifurcated portion

What is claimed is:

1. A door conveying apparatus, comprising:
a door conveying line;
a door conveying traveling body traveling on the door conveying line;
two door hangers conveyed by the door conveying traveling body and each door hanger having an upper portion;
a supported portion provided only on the upper portion of each door hanger;
a door hanger supporting portion provided on both left and right sides of the door conveying traveling body and supporting only the supported portion of the door hanger;
a space formed between the two door hangers in such a manner that when the two door hangers are supported by the door hanger supporting portion on both left and right sides respectively, a topside thereof is closed by the door conveying traveling body and both left and right sides thereof are closed by the two door hangers hanging from the door conveying traveling body, and a downside thereof and traveling-direction both front and rear sides of the door conveying traveling body are opened;
a door support on each door hanger and the door support supporting a door on a side of the door hanger opposite to a side adjoining the space;
wherein the supported portion of each door hanger is provided in a cantilever manner on a side opposite to a side where the door support is located, each door hanger comprising a suspension frame and the support portion projecting from an upper end of the suspension frame, and the door conveying traveling body comprising an abutting portion abutting against a side surface of the door hanger and preventing a lower portion of the door hanger from swinging to the downside of the door conveying traveling body when the supported portion of the door hanger is supported by the door hanger supporting portion of the door conveying traveling body.

2. The door conveying apparatus according to claim 1, wherein the abutting portion of the door conveying traveling body comprises a roller pivotally supported by a shaft parallel to a traveling direction of the door conveying traveling body, the side surface of the door hanger against which the abutting portion abuts comprises a vertical abutted surface of a guide member attached to the suspension frame, and a lower end portion of the guide member comprises an inclined guide surface guiding the abutting portion to the abutted surface.

* * * * *